April 7, 1970  M. D. PERSIDSKY  3,504,964
DEVICE FOR TAKING AND PROJECTING MOTION PICTURES
Filed Aug. 21, 1967  18 Sheets-Sheet 1

INVENTOR.
MAXIM D. PERSIDSKY
BY
John E. Diehl
ATTORNEY

April 7, 1970 M. D. PERSIDSKY 3,504,964
DEVICE FOR TAKING AND PROJECTING MOTION PICTURES
Filed Aug. 21, 1967 18 Sheets-Sheet 4

INVENTOR.
MAXIM D. PERSIDSKY
BY John L. Diehl
ATTORNEY

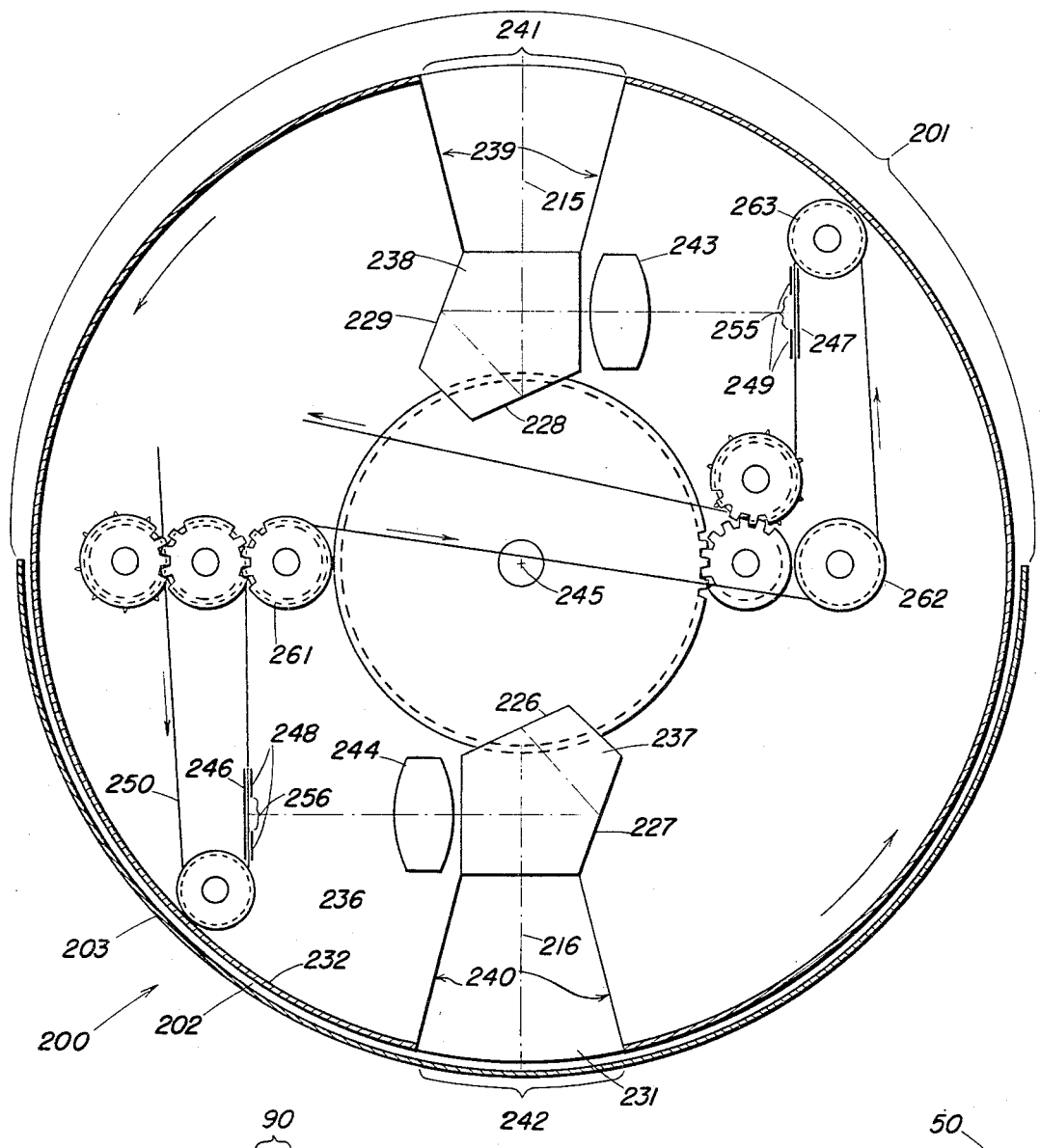

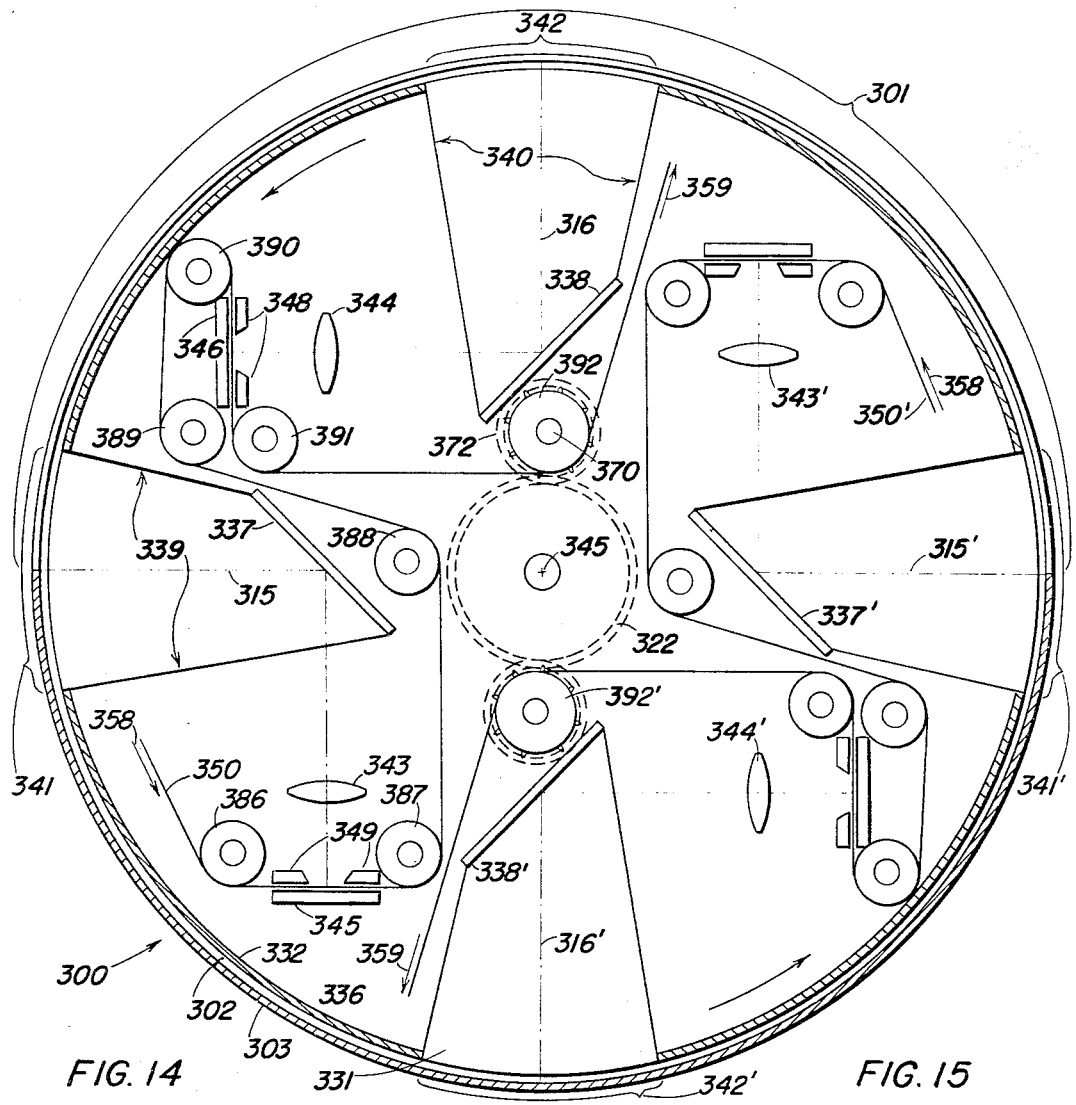

April 7, 1970  M. D. PERSIDSKY  3,504,964
DEVICE FOR TAKING AND PROJECTING MOTION PICTURES
Filed Aug. 21, 1967  18 Sheets-Sheet 7

INVENTOR.
MAXIM D. PERSIDSKY
BY
ATTORNEY

INVENTOR.
MAXIM D. PERSIDSKY
ATTORNEY

April 7, 1970     M. D. PERSIDSKY     3,504,964

DEVICE FOR TAKING AND PROJECTING MOTION PICTURES

Filed Aug. 21, 1967     18 Sheets-Sheet 11

INVENTOR.
MAXIM D. PERSIDSKY
BY John L. Diehl
ATTORNEY

April 7, 1970   M. D. PERSIDSKY   3,504,964
DEVICE FOR TAKING AND PROJECTING MOTION PICTURES
Filed Aug. 21, 1967   18 Sheets-Sheet 13

INVENTOR
MAXIM D. PERSIDSKY
BY
ATTORNEY

April 7, 1970   M. D. PERSIDSKY   3,504,964
DEVICE FOR TAKING AND PROJECTING MOTION PICTURES
Filed Aug. 21, 1967   18 Sheets-Sheet 14
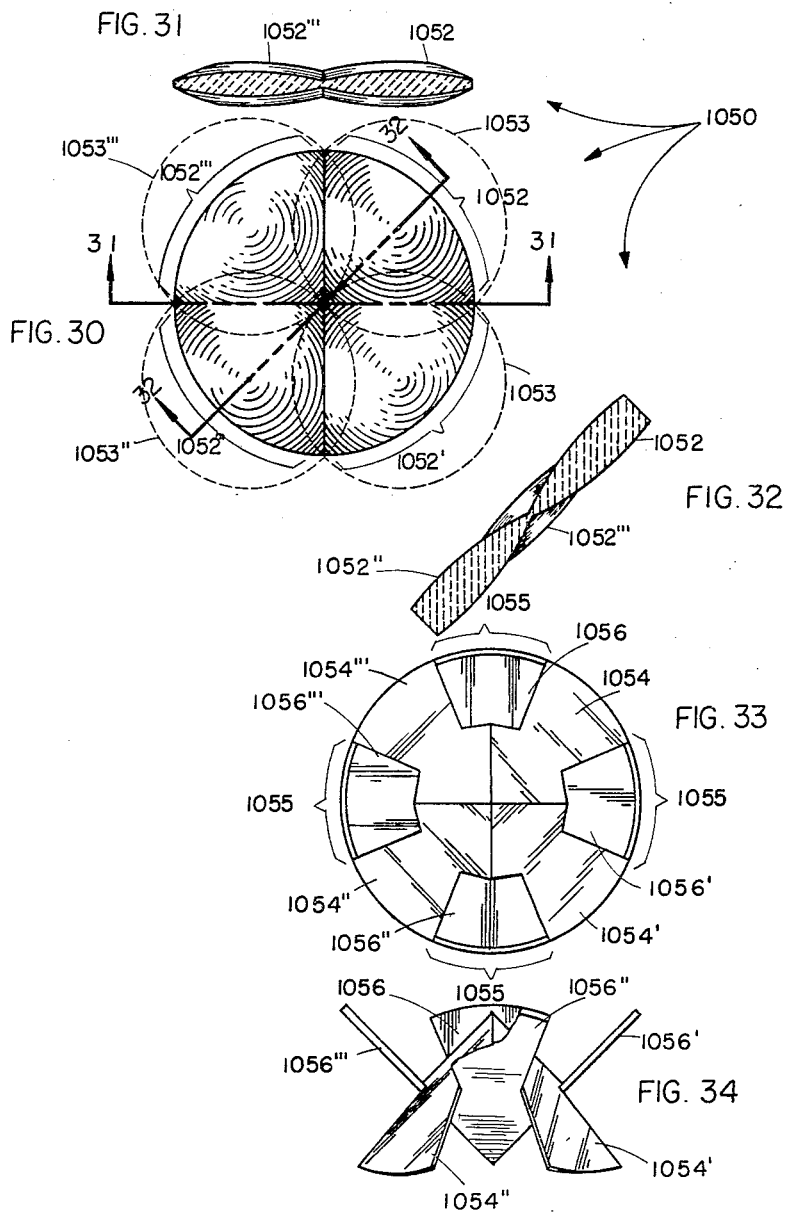
INVENTOR
MAXIM D. PERSIDSKY
BY
ATTORNEY April 7, 1970     M. D. PERSIDSKY     3,504,964
DEVICE FOR TAKING AND PROJECTING MOTION PICTURES
Filed Aug. 21, 1967     18 Sheets-Sheet 15
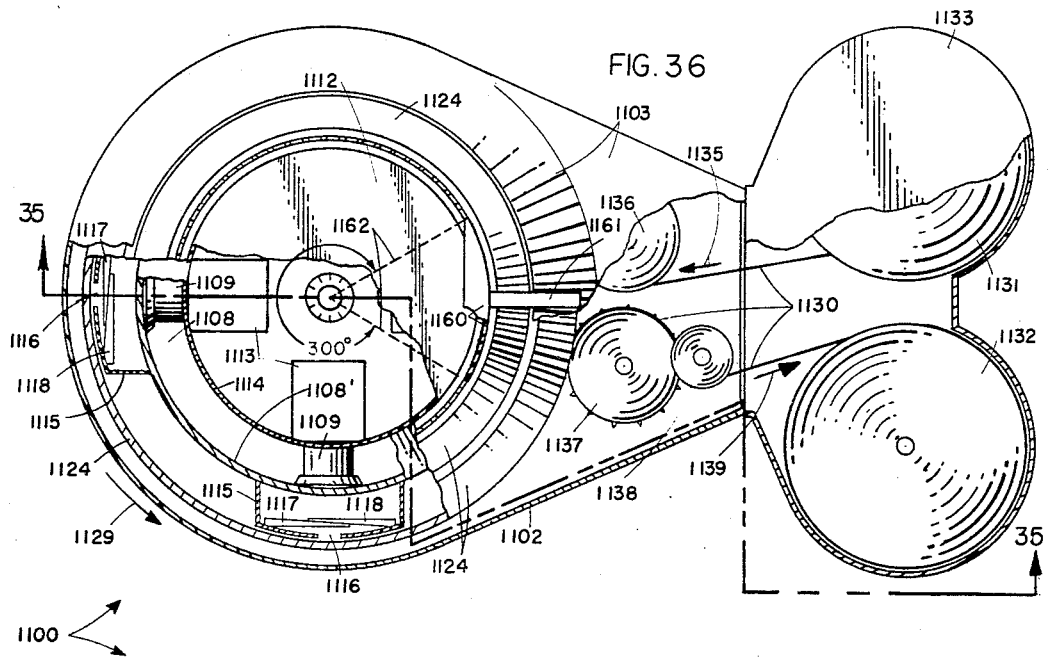
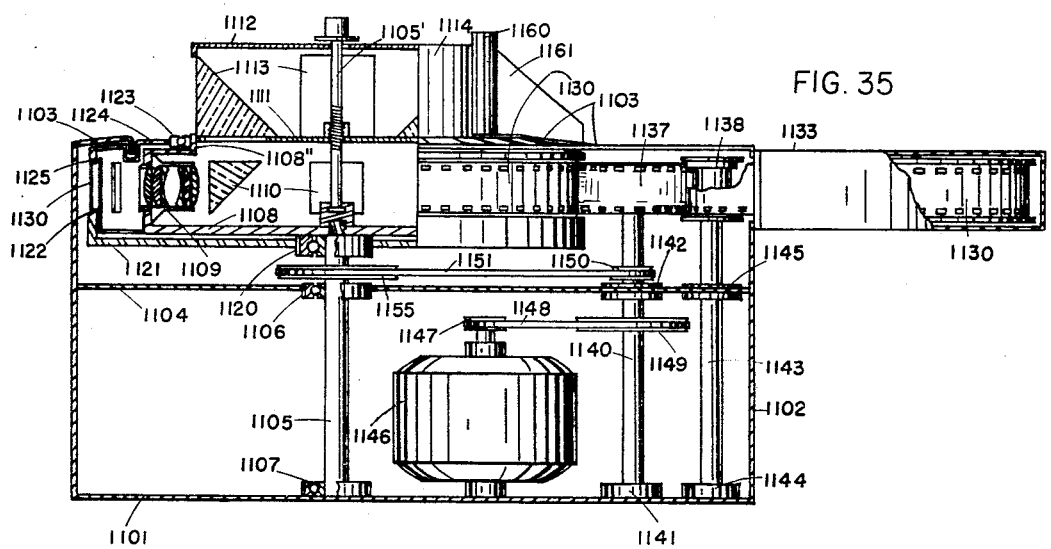
INVENTOR.
MAXIM D. PERSIDSKY
BY
ATTORNEY

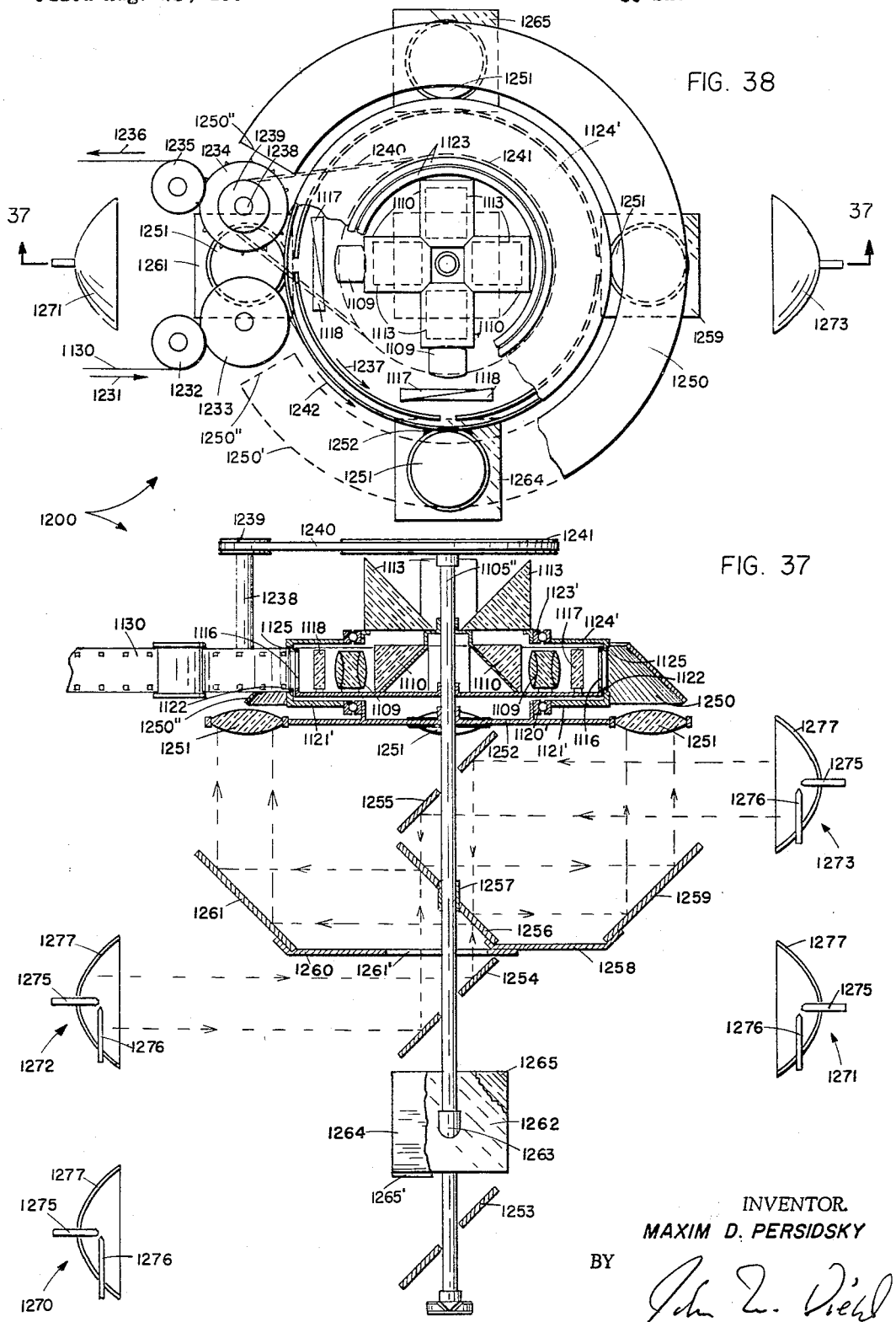

April 7, 1970 M. D. PERSIDSKY 3,504,964
DEVICE FOR TAKING AND PROJECTING MOTION PICTURES
Filed Aug. 21, 1967 18 Sheets-Sheet 18

INVENTOR.
MAXIM D. PERSIDSKY
BY
ATTORNEY

United States Patent Office 3,504,964
Patented Apr. 7, 1970

3,504,964
DEVICE FOR TAKING AND PROJECTING MOTION PICTURES
Maxim D. Persidsky, 554 9th Ave., San Francisco, Calif. 94118
Continuation-in-part of application Ser. No. 608,227, Jan. 9, 1967. This application Aug. 21, 1967, Ser. No. 663,928
Int. Cl. G03b *41/02, 37/00, 41/00*
U.S. Cl. 352—105                                  27 Claims

ABSTRACT OF THE DISCLOSURE

A panoramic motion picture device is provided which may be either a camera or a projector. The camera and projector are respectively provided to photograph and project through angles as great as 360°. The device comprises a plurality of substantially optically identical optical systems. Each of these systems comprises a film gate, a lens and one or more mirrors or other reflective surfaces optically on the object side of the lens in a camera. In a projector they are on the image side of the lens. All elements of the systems are substantially fixedly located in spaced relationship to each other and to an axis of rotation about which they are rotated. Each system is arranged to cause the effective second nodal point of the lens to fall on the axis although the lenses, film gates and reflecting elements themselves are spaced from the axis. A single web of film is moved continuously and non-intermittently past the film gates.

This application is a continuation-in-part of application Ser. No. 608,227, filed Jan. 9, 1967, which is a continuation of application Ser. No. 536,505, filed Feb. 17, 1966, which is a continuation of Ser. No. 463,434, filed May 17, 1965, which is a continuation of Ser. No. 391,538, filed Aug. 17, 1964, which is a continuation of Ser. No. 304,355, filed Oct. 17, 1963, which is a continuation of Ser. No. 218,200, filed Aug. 13, 1962, which is a continuation of Ser. No. 657,290, filed May 6, 1957, now abandoned having the same title.

This invention relates to a device for taking and projecting motion pictures through an angle of vision of preferably 170° or 180° or from 280° to 330° or optionally as much as 360°.

My invention has the advantages of providing a single film web, of providing for continuous non-intermittent movement of the film web, of providing for taking and projecting a relatively large number of frames per second, to reduce or substantially eliminate flickering while at the same time operating through the above mentioned viewing angle. My invention eliminates "smearing" or "fuzzing" of pictures due to parallax which heretofore has been eliminated only by the use of a very small slit or aperture. In the device of my invention a relatively wide slit or aperture may be used thus allowing a large amount of light to fall on the film and reducing the exposure time so that each frame can be exposed in the camera or projected in the projector in a relatively short period of time.

A motion picture camera and projector in accordance with my invention include the following novel features:

(1) At least two lenses located apart from the mechanical center of rotation.

(2) At least one reflecting surface in front of each of the lenses such that the optical system comprising the lens and reflecting surface provides a light path and image formation equivalent to that formed if the reflecting surface were omitted and the lens placed at the mechanical center of rotation, i.e., the second nodal point in the virtual image of the lens which is formed by the mirror or mirrors is at least substantially on the axis of rotation.

(3) Continuous (non-intermittent) film travel.

(4) All frames on a single web of film (though two or more webs may be used in certain modifications if desired).

(5) If desired, a frame sequence on a single web of film whereby no successive picture or image taken by the camera or projected by the projector falls in a sequential or successive frame in the web with respect to the frame in which the previously taken or projected picture appears.

As a result of these features, my camera has certain advantages which, in addition to said features, include the following: Only a single strip of film is used and only two film reels are necessary; the film passing from one thence through the camera and thence onto the other. The field of view may be as great as desired; if desired it may be 360° but preferably is 170° or 180° or from 280° to 330°. It may, for example, be varied from as low as 120° up to as high as 180° without change of design. There is no fuzziness in the image resulting from parallax.

It is therefore an object of my invention to provide a motion picture camera and projector each having a field of view of 170° or 180° or wider and utilizing a single web of film travelling with a continuous non-intermittent motion.

Another object is such a camera and projector wherein a clear and concise image is formed on the film by light passing through a slit of relatively large width and which is therefore operable with relatively short exposure time and high rates of film travel such as 24 or 48 frames per second, and flickering is reduced.

Another object is a motion picture camera and projector operable with a single web of film travelling continuously and non-intermittently.

Further objects will become apparent from the figures and the following detailed description wherein it is my intention to illustrate the applicability of the invention without thereby limiting its scope to less than that of all those equivalents which will be apparent to those skilled in the art. In the figures like reference numerals refer to like parts and:

FIGURE 9 is a top plan view of another embodiment of a camera which may be used as a projector according to the invention having a top closure portion thereof removed;

FIGURE 10 is a schematic view of the film web showing the sequence of exposure of frames therein;

FIGURE 11 is a schematic view of the film web showing the sequence of exposure of frames therein;

FIGURE 12 is a schematic view of the film web showing the sequence of exposure of frames therein;

FIGURE 13 is a plan view from above of another embodiment of a camera according to the invention with the top closure portions thereof removed;

FIGURE 14 is a schematic view of a film web exposed in the camera of FIGURE 13 showing the sequence of frames therein;

FIGURE 15 is a schematic view of a web of film exposed in the camera of FIGURE 13 at substantially the same time as the web of FIGURE 14 showing sequence of exposure of frames therein;

FIGURE 16 is a schematic view of a web of film printed from the webs of FIGURES 14 and 15 showing the source of the images printed thereon and the sequence of exposure of images in the several frames thereof;

FIGURE 10 is a schematic plan view of one side of the optical systems of the projector of FIGURE 19;

FIGURE 30 is a plan view of one of the elements of the embodiment of FIGURES 28 and 29;

FIGURE 31 is a cross-sectional view of the element of FIGURE 30, taken on lines 31—31 in FIGURE 30;

FIGURE 32 is a cross-sectional view of the element of FIGURE 30, taken on lines 32—32 in FIGURE 30;

FIGURE 33 is a plan view of another element of the embodiment of FIGURES 28 and 29;

FIGURE 34 is a partially cutaway elevation from one side of the element of FIGURE 33;

FIGURE 35 is a partially cross-sectional, partially cutaway view of another embodiment of a camera, taken on lines 35—35 in FIGURE 36;

FIGURE 36 is a top plan view, partially cutaway, of the embodiment of FIGURE 35;

FIGURE 37 is a schematic cross-sectional elevation of another embodiment of a projector, which corresponds optically to the embodiment of FIGURES 35 and 36;

FIGURE 38 is a schematic, partially cutaway, top plan view of the embodiment of FIGURE 37;

Heretofore, it has been known that in order to provide a maximum amount of resolution with the maximum amount of light and thus provide a minimum exposure time in a panoramic or circuit camera it is necessary that the lens be located with its second nodal point at the axis of rotation of the lens or camera; if this be not the case there is fuzziness in the image due to parallax which can only be compensated for by providing a slit between the lens and the film which is of very narrow width, for example as narrow as $\frac{1}{16}$, $\frac{1}{32}$ or even $\frac{1}{64}$ inch with 35 millimeter film, and which must be substantially infinitely narrow with resultant extremely long exposure time in order to obtain truly complete clarity, as in a pin hole camera. However, by so arranging the elements of a circuit camera that the lens rotates with its second nodal point (second principal plane or second principal point) at the axis of rotation, the slit between the lens and the film may be as wide as desired subject only to the limitations of the lens, in order to obtain any suitable exposure time in accordance with the speed of rotation of the lens and the sensitivity of the film.

It has also been heretofore known to utilize a plurality of lenses, i.e., two lenses or more in a rotating camera to take and project motion pictures through 360°. However, if more than two lenses be provided there has been no possibility whereby they may be both placed with their second nodal point on the axis of rotation.

I have found that it is not in fact necessary that each lens be so arranged that its second nodal point is coincident with the mechanical axis of rotation if certain other conditions are met which are not met in said patent.

Figure 1:
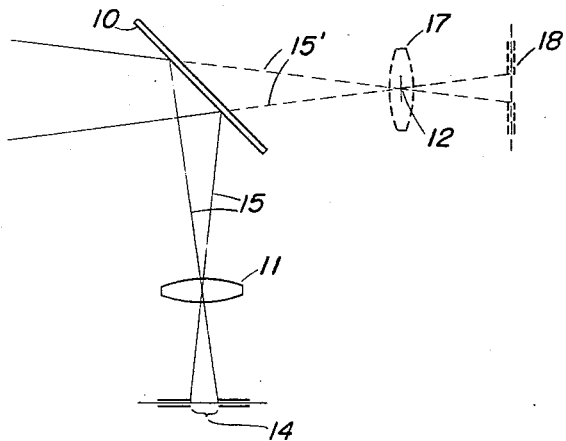
FIGURE 1 is a schematic plan view of an optical system for a camera or projector in accordance with the invention.

If, as shown in FIGURE 1, I provide a rotating optical system comprising one reflecting surface 10 and a lens 11 and a film gate 14 in fixed relationship with each other but rotatable about axis of rotation 12 (the surface 10 and the principal planes of the lens being parallel to the axis of rotation) and if suitable means are provided to cause a film to present a flat sensitized surface at the focal plane of the lens as at film gate 14, the system exhibits the same properties with respect to image formation in terms of clarity, exposure time and the like, as if the lens were mounted with its second nodal point at the axis 12 itself, the actual light path of two central rays being shown by lines 15. The equivalent optical path which these rays would follow if reflecting surface 10 were not interposed are shown by dotted lines 15'. If the light followed the path of lines 15' it would pass through a lens at 17 and into contact with the film at 18. It will be noted that if a lens were positioned at 17, it would have its second nodal point at the mechanical axis of rotation. The position of a lens at 17 is the virtual image of lens 11 formed by reflecting surface 10.

It has also been known heretofore to provide panoramic cameras wherein one or more mirrors have been positioned in front of the lens thereof. These, of course, have not been motion picture cameras nor projectors nor convertible to such use. But of more importance is the fact that in such devices the reflecting surface or surfaces have been so arranged that the virtual image of the lens which is formed by such surface or surfaces is widely displaced from the mechanical axis of rotation.

The effective light path and the optical effect of a system containing, for example, three reflective surfaces, may be determined by considering that the reflecting surface nearest the lens be removed and the lens suitably be changed in position to occupy the position of its virtual image formed by said surface before removal thereof and the next surface be removed and again the lens changed in position in similar manner and finally the surface first reached by the light be removed and the lens again changed in position to occupy the position previously held by its virtual image.

Thus, in accordance with my invention, there must be a plurality of lenses and at least one reflecting surface in front of each lens. And the lens and the reflecting surface, or surfaces, if more be used, must be fixed with respect to one another and attached to a rotatable support and located so that the second nodal point in the virtual image formed by the reflecting surface or surfaces of the lens is at the axis if rotation of said support.

It has heretofore been proposed to simultaneously project pictures on several adjacent portions of a curved screen with a corresponding number of projectors operated synchronously. My invention provides a projected image which is devoid of the vertical junctures which are present between such pictures and eliminates need for a plurality of projectors and synchronizing equipment therefore.

My invention is characterized by the relatively low expense which is incurred in taking, editing and finally projecting pictures through a very wide field of vision since only one web of film is used. The additional advantage, namely that the film is caused to travel continuously rather than intermittently through both the camera and projector need not be elaborated on. Standard motion picture film is worn out after often less than 100 showings and seldom is usable for more than 200 or perhaps at the most 400 showings and this rapid obsolescence of a film web is due primarily to the high longitudinal acceleration forces produced by the starting and stopping necessary in producing intermittent motion and perhaps even more by abrasion and friction of the pull-down forks against the edges of the holes provided at the periphery of the film for the forks to engage.

Thus as hereinbefore described my device not only produces motion pictures through a wide field of vision with less distortion than methods heretofore known and with greater clarity than heretofore possible but this is accomplished by means whereby film wear is greatly reduced and cost of photographing, editing, processing and reproducing for a wide screen process is also greatly reduced.

Figure 2:
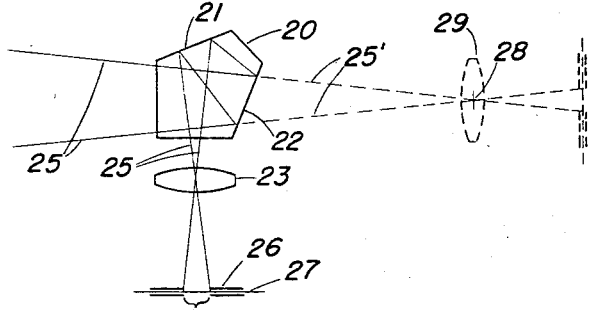
FIGURE 2 is a schematic plan view of an optical system for a camera or projector in accordance with the invention.

Now referring to FIGURE 2, there is shown another rotating optical system comprising a prism 20 having two reflecting surfaces designated respectively 21 and 22 and a lens 23 and a film supporting mechanism or supporting gate members 26 which provide slit 24 and which are adapted to have film 27 pass therethrough. Prism 20, lens 23 and gate 26 are arranged in fixed relationship with respect to one another and are rotatable about axis of rotation 28.

The prism forms a virtual image of lens 23 at 29. The actual light paths of central rays are shown by lines 25. If prism 20 were not interposed the light would substantially follow the path of dotted line 26'. The device shown thus has the same optical properties as if prism 20 were omitted and lens 23 were disposed at 29 with its second nodal point actually at the mechanical axis of rotation. In short, the system has the property that the second nodal point of the virtual image of the lens which is formed by the prism is at the mechanical axis of rotation so that the lens itself is well removed from the mechanical axis of rotation and the system exhibits the same behavior as if the lens were actually located with its second nodal point on the axis of rotation. For purposes of simplification, consideration of the slight change in position of the virtual image which is caused by the refraction of the rays within the prism have been omitted.

Figure 3:
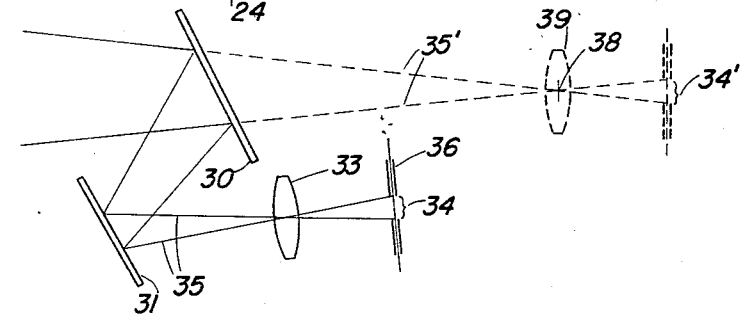
FIGURE 3 is a schematic plan view of an optical system for a camera or projector in accordance with the invention.
Figure 4:
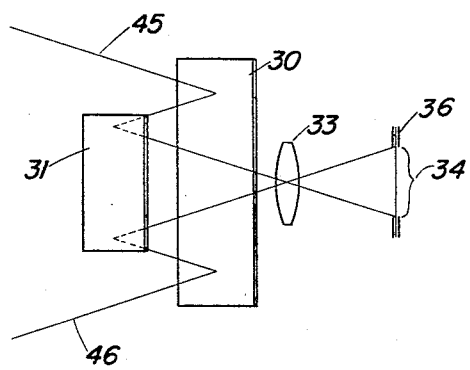
FIGURE 4 is a schematic elevation of the system of FIGURE 3.

Referring now to FIGURES 3 and 4, there is shown another rotating system comprising reflecting surface 30, reflecting surface 31, lens 33 and film gate 36 provided with vertical slit 34, all fixed with respect to one another and rotatable about vertical axis of rotation 38.

Two chief rays in a horizontal plane are shown by lines 35 and the paths which these rays would take if the reflecting surfaces were not interposed are shown by lines 35'. A virtual image of lens 33 is formed at 39 and as in the systems of FIGURES 1 and 2, the combination of elements 30, 31 and 33 provide an image at 34 which precisely corresponds to the image which would be formed at 34' by rays 35' if lens 33 were placed at 39 and the reflecting surfaces were omitted.

Chief rays 45 and 46 which extend to the bottom and top of the image formed at slit 34, first strike reflecting 30 and then strike reflecting surface 31 and then pass through lens 33 and as shown, it is desirable that the reflecting surface 30 more remote from the lens be larger than the reflecting surface 31 interposed in the light path between reflecting surface 30 and the lens.

Figure 5:
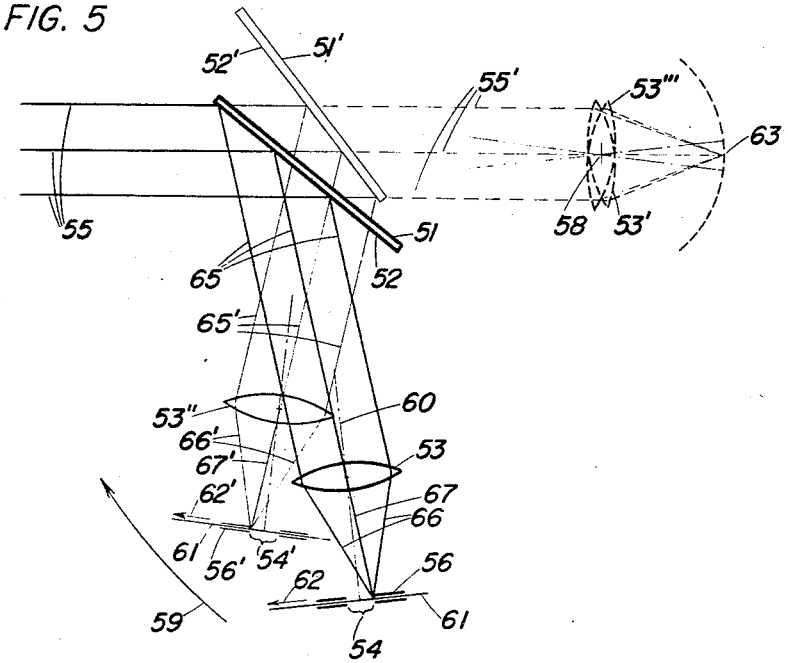
FIGURE 5 is a schematic plan view of an optical system for a motion picture camera or projector according to the invention showing positions thereof before and after an increment of rotation and showing shift of the image resulting from such rotation.

Referring now to FIGURE 5, there is shown schematically a mirror 51 having a reflective surface 52, lens 53 having optical axis 60 and film supporting device or gate 56 having a vertical slit 54 therein, these elements being supported in fixed relationship with respect to one another and rotatable about axis of rotation 58 in the direction shown by arrow 59. Film gate 56 is adapted to receive film 61 travelling therethrough in the direction shown by arrow 62 so that it may be exposed at slit 54. The paths of three rays from an object at an infinite distance are shown by lines 55. After being reflected by surface 52 they pass as shown by lines 65 and converge as shown by lines 66 and 67 at the right-hand edge of slit 54. It may be noted that the central or chief ray 67 is at an angle with the optical axis 60 of the lens.

The virtual image of lens 53 formed by surface 52 is at 53' with its second nodal point on the axis of rotation 58 and if mirror 51 were not interposed and lens 53 were placed at the position occupied by its virtual image 53', rays 55 would pass as shown by rays 55' through the lens at 53' and an image would be formed at point 63.

After the elements have been rotated to a certain extent, mirror 51 will occupy a new location as shown at 51', surface being in the position shown at 52''. Lens 53 will be at the position shown as 53'', gate 56 at 56' and film 61 will still be travelling in the direction shown by arrow 62'. The rays 55 will then pass from surface 52' as shown by lines 65' and will converge as shown by lines 66' and 67' at a point at the left edge of slit 54'. Due to the movement of the film in the direction shown by arrows 62 and 62' the point in the film which is at the right edge of slit 54 will be at the left edge of the slit as shown at 54'. The point of convergence of the rays will continue to be at precisely the same point in the film despite the motion of the image in space both transversely and rotationally and despite the motion of the film in space both transversely and rotationally, i.e., the point of convergence of the rays moves at the same rate and in the same direction as the film and thus the image will be sharp and clear and not fuzzy. This may be more thoroughly understood by referring to the virtual image 53''' of lens 53 which is formed by the reflecting surface when the lens is at the position of its virtual image 53''' and the reflecting surface were removed, lines 55' would converge at points 63, i.e., at precisely the same point as lines 55 would converge and form an image when the several elements were in the first position prior to being rotated, in other words the image would be stationary with respect to the object.

Figure 6:
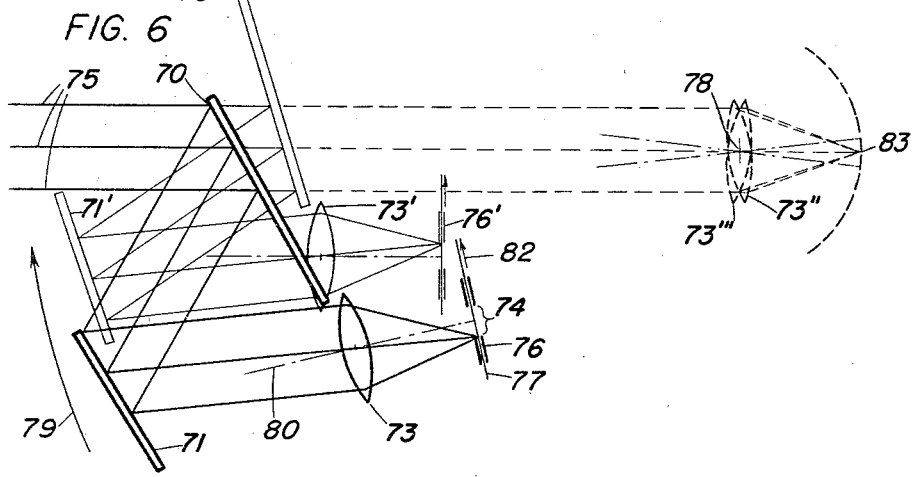
FIGURE 6 is a schematic plan view of an optical system for a motion picture camera or projector according to the invention showing positions thereof before and after an increment of rotation and showing shift of the image resulting from such rotation.

With reference now to FIGURE 6, there is shown another rotating optical system which, like the system shown in FIGURE 6, comprises a lense 73 and a film gate 76 adapted to rotate about an axis of rotation 73. The system differs from that of FIGURE 5 essentially only in that two reflecting surfaces have been interposed between light coming from an object at infinite distance as indicated by lines 75 and lens 73 in place of the single surface of FIGURE 5, said surfaces being indicated as 70 and 71.

The optical axis of lens 73 is shown by dot-dash line 80. Film 77 passes through gate 76 and slit 74 therein in the direction shown by arrow 82. Reflecting surfaces, lens and film gate may be rotated as shown by arrow 79 to positions shown respectively at 70', 71', 73' and 76'.

Before being rotated the image formed from rays 75 after being reflected by surfaces 70 and 71 and refracted by lens 73 is at the bottom of the slit 74 in film gate 76 whereas after the system has rotated somewhat the image is at the top of the slit in the film gate as shown at 76'. If the image were formed by rotation of a lens at position 73" and 73"' it would remain stationary at point 83; position 73" and 73"' represent the virtual image of lens 73 when at the position 73' respectively formed by the reflecting surfaces before and after rotation to the extent shown and the second nodal points thereof are at the axis of rotation 78.

Figure 7:
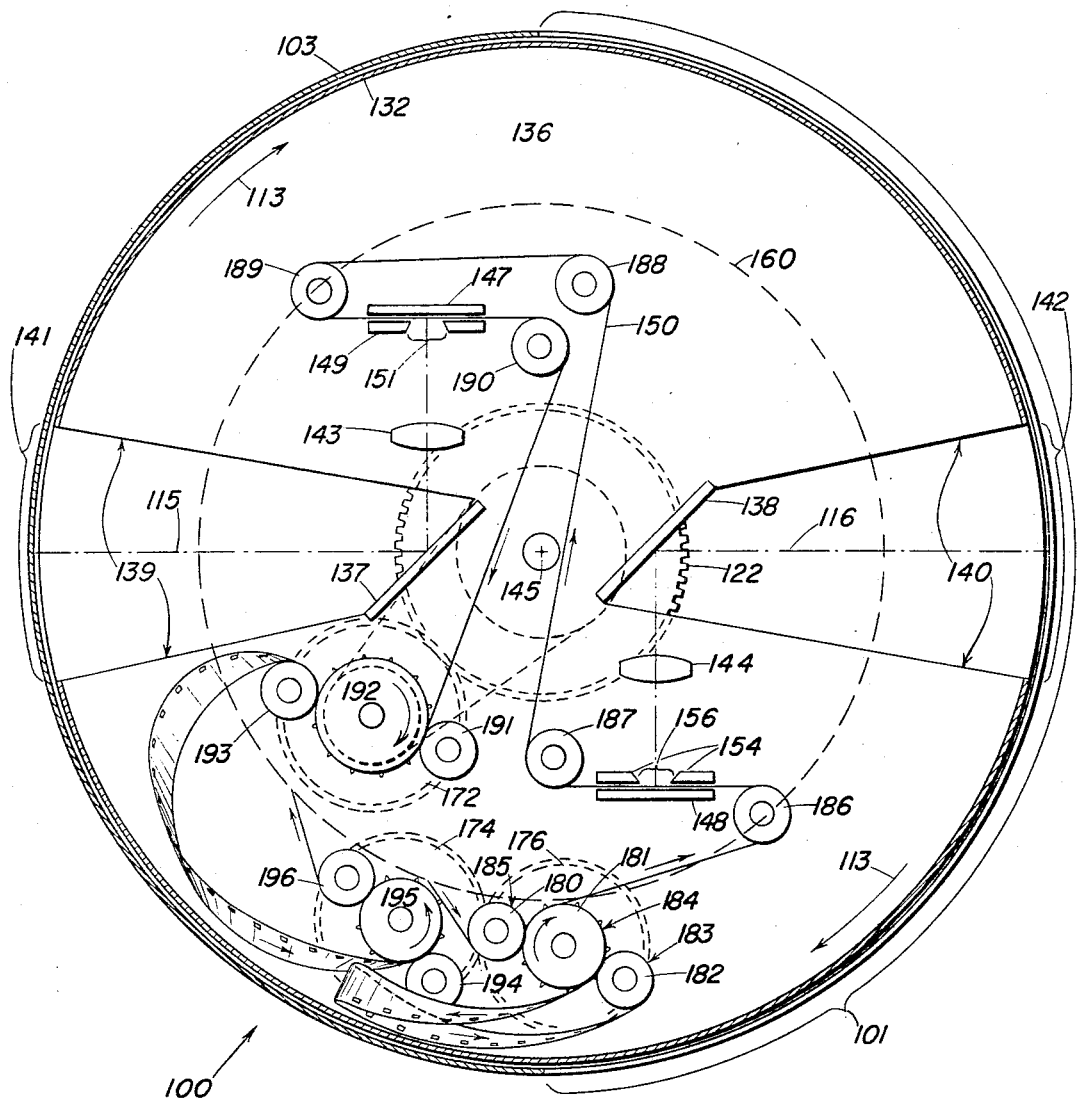
FIGURE 7 is a plan view from above of a camera which may be used as a projector according to the invention having the top closure portions thereof removed.
Figure 8:
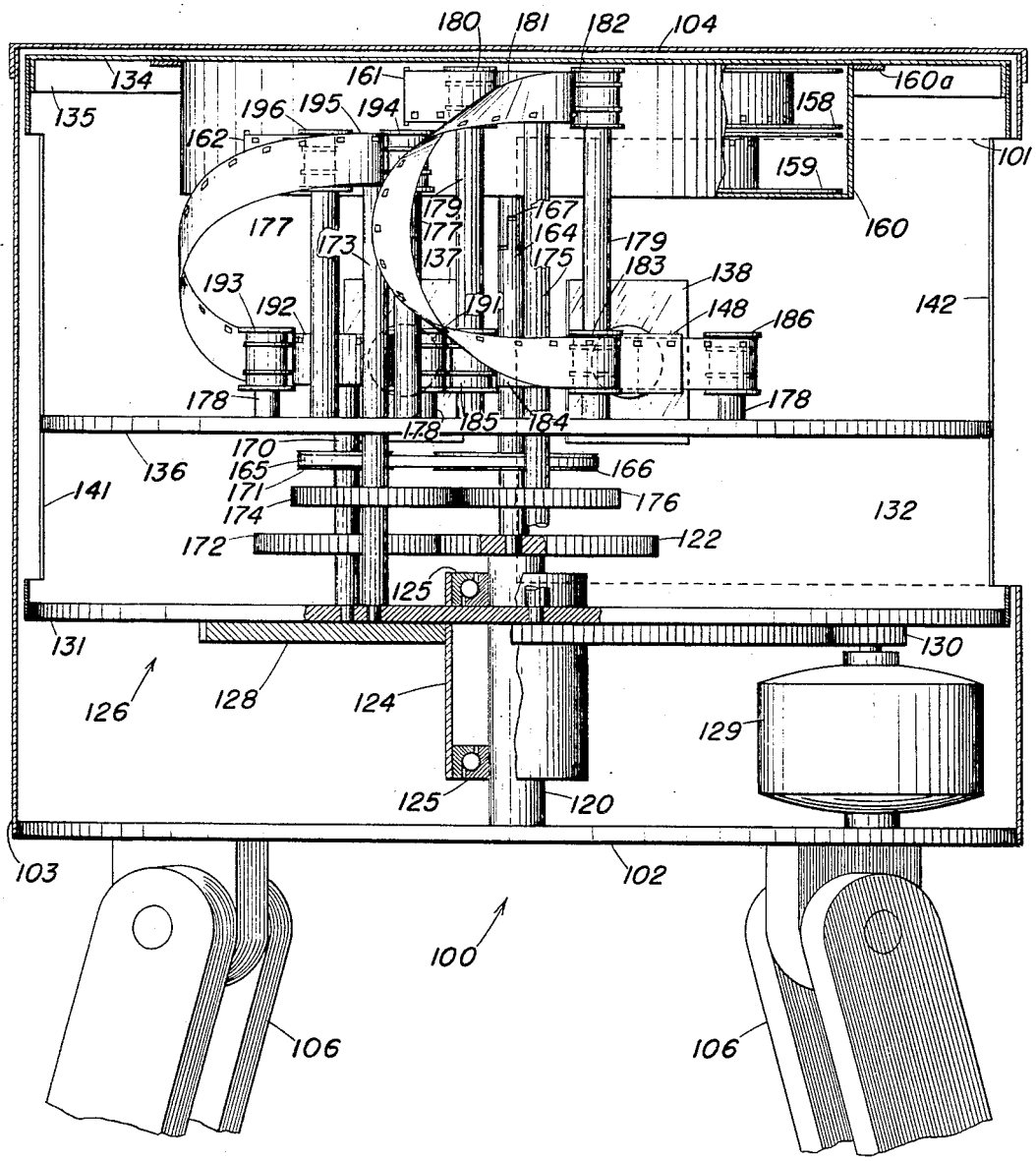
FIGURE 8 is a partially cut-away side elevational view of the camera which may be used as a projector of FIGURE 7 having the top closure portions in place.

Referring now to FIGURES 7 and 8 there is shown a camera according to the invention wherein a housing indicated generally as 100 comprises a flat bottom portion 102, a cylindrical side portion 103 and a top 104 which may be flat and removable as a lid or closure, as shown. Housing 100 may be supported by any suitable means adapted to maintain it in a stable, stationary position such as legs 106. A portion of the outer surface of housing 100 is cut away through at least 170° and preferably through 180° about axis of rotation 145 as shown at 101. Within housing 100 there is provided a vertical stationary member 120 attached to bottom portion 102 and extending upwardly therefrom and having fixedly attached at the top thereof gear 122. Rotatably mounted thereon in coaxial relationship therewith there is provided tube 124 which may have fixedly attached thereto a rotatable housing indicated generally as 126 and large spur gear 128. Tube 124 may be rotatably supported on member 120 by antifriction bearings 125 and may be caused to rotate by motor 129 acting through gear 130 on gear 128. Housing 126 may comprise flat bottom portion 131, cylindrical side portion 132 and a top 134 which may be flat and removable as a lid or closure as shown and which may be provided with locating and positioning flange 135 depending therefrom and frictionally engaging the interior surface of portion 132. Fixedly attached to and supported by cylindrical side portion 132 there may be provided flat horizontal supporting plate 136. The supporting means for housing 100 such as legs 106, is preferably adapted to support said housing in either a vertical or tilted position, i.e., in a position wherein axis of rotation 145 is either vertical or tilted.

Plate 136 is provided with vertical mirrors 137 and 138 mounted thereon and is cut away as at 139 and 140 to provide an unobstructed path for light to reach the mirrors from slots 141 and 142 which may be provided in the walls of cylindrical side portion 132 adjacent to mirrors 137 and 138. Lenses 143 and 144 are mounted on plate 136 in such manner that their optical axes are in planes perpendicular to the axis of rotation 145 and in such manner that the second nodal points of the virtual images of lenses 143 and 144 which are formed respectively by mirrors 137 and 138 are at the axis of rotation 145. Mounted on plate 136 and disposed back of lens 143 there is provided film back-up plate 147 and likewise back of lens 144 there is provided film back-up plate 148. In front of plate 147 and in close proximity thereto there are provided film gate members 149 adapted to allow film 150 to pass between members 149 and 147 and to provide slit 151 through which light may pass from lens 143 into the film. Likewise in close proximity to back-up plate 148 there are provided film gate members 154 which provide slit 156 and are adapted to receive film 150 between plate 148 and members 154.

Film reels 158 and 159 may be contained within housing 160 which depends from closure member 134 and may be removably attached thereto by such means as screws (not shown) which may attach flange 160a to top member 134. Film 150 may unreel from reel 158 and pass outwardly through slit 161 in said housing and may thence pass behind lenses 144 and 143, being guided and driven by sprockets as hereinafter described, and thence may be reeled onto reel 159, passing into housing 160 through slit 162. Suitable means for allowing reels 158 and 159 to rotate with a minimum of friction with respect to one another and housing 160 may be provided within housing 160 and for the sake of simplicity are not shown. Reel 159 may be caused to rotate and to wind film 150 thereupon by shaft 164 rotatably mounted in plate 136 which may be driven from shaft 170 through belt 165 acting upon pulley 166 attached to the bottom of shaft 164. Shaft 164 may removably interlock with shaft 167 which may project downwardly through the bottom of housing 160 and may drivably engage reel 159. Belt 165 may slip on pulley 166 and on pulley 171 mounted on shaft 170 to compensate for the variation of the diameter of the reeled film on reel 159.

The position occupied by housing 160 vertically above the elements shown in FIGURE 7 is indicated by the dashed line 160.

From slit 161, film 150 travels over idler roll 180, thence over driving sprocket 181, thence between sprocket 181 and idler roll 182, thence downwardly in a 180° loop, thence over idler roll 183 and between said roll and driving sprocket 184, thence over sprocket 184 and between sprocket 184 and idler roll 185, thence over idler roll 186, thence between backing plate 148 and gate members 154, thence over idler roll 187, thence over idler roll 188, thence over idler roll 189, thence between film backing-up plate 147 and gate members 149, thence over idler roll 190, thence between idler roll 191 and driving sprocket 192, thence over driving sprocket 182 and thence between sprocket 192 and idler roll 193, thence upwardly in a loop and then between idler roll 194 and driving sprocket 195, over sprocket 195 and between sprocket 195 and idler roll 196 and thence into housing 160 through slit 162. Shaft 170 is rotatably mounted in plates 136 and 131 and is caused to rotate by gear 172, fixedly attached thereto and driven by gear 122 as housing 126 rotates. Film driving sprocket 192 is fixedly attached to the top of shaft 170. Shaft 164 is rotatably mounted in plate 136 and the top of member 120. Shaft 173 is rotatably mounted in plates 136 and 131 and carries driving sprocket 195 fixedly attached to the top thereof and spur gear 174 fixedly attached thereto. Shaft 175 is rotatably mounted in plates 136 and 131 and carries driving sprockets 181 and 184 fixedly attached thereto and gear 176 fixedly attached thereto. The action of driving sprocket 192 pulls the film web 150 through the device and pulls the film over sprocket 184, causing shaft 175 to rotate and shaft 173 is caused to rotate at the same speed by the interaction of gears 174 and 176. Therefore, each of sprockets 195, 181 and 184 may be caused to have the same peripheral speed as sprocket 192 and the speed of the film throughout the camera may be maintained constant and the film loops be maintained of constant size. Shafts 178 are rigidly attached to plate 136. Sprockets 186, 191 and 193 rotatably mounted thereon. Shafts 179 and 177 are also fixedly attached to plate 136 and respectively have rotatably mounted thereon idler rolls 182, 183, 180, 185, 194 and 196.

By means not shown the rigid attachment of shafts 179 and 177 to plate 136 may be loosened and the shafts slid sidewise to disengage the idlers carried thereby from the driving rolls so that film may be unthreaded or threaded on said driving rolls. The path of a chief ray on the optical axis of the optical system comprising mirror 137, lens 143 and the slit between film gate members 149 is indicated by the dotted-dashed line 115 and, similarly, a chief ray on the optical axis of the system comprising mirror 138, lens 144 and slit 156 is indicated as 116.

In use, the device is caused to rotate at such speed that with concomitant movement of the film there is provided on the film a plurality of images at intervals approximating the image retention period of the eye or preferably at intervals shorter than said period.

Referring now to FIGURE 9, housing indicated generally as 200 comprises flat bottom portion 202, cylindrical side portion 203 and a top portion which is for the sake of simplicity not shown, the view being a plan view of the camera with said top portion removed. A portion of one side of cylindrical side 203 is cut away through at least 170° and preferably through 180° as indicated by brackets 201. Within housing 200 there is provided a rotating housing comprising a flat bottom portion 231, a cylindrical side portion 232 and a top portion, not shown, which may be removable as a lid or closure and may be similar or identical to closure 134 as shown in FIGURE 8 and may have a housing such as 160 dependent therefrom and adapted to contain film reels such as 158 and 159, such closure being not shown in order to permit illustration of the interior of the camera. Within housing 232 there is provided flat horizontal plate 236 having prisms 237 and 238 mounted thereon. Plate 236 is cut away as at 239 and 240 and cylindrical wall 232 is cut away as at 241 and 242 to permit access of light to the prisms. Mounted on plate 236 there are provided lenses 243 and 244, film backup plate members 246 and 247 and film gate members 248 and 249 adapted to provide slits 256 and 255 therebetween. The prisms and lenses are so mounted that the second nodal points in the virtual images of the lenses formed by thereflecting surfaces of the prisms fall at the axis of rotation 245. Film 250 is adapted to be caused to travel between backup plate 246 and film gate members 248, thence over suitable direction changing idlers such as 261 and 262 and 263 and then between back-up plate 247 and film gate members 249, thence over suitable idlers and sprockets to a wind-up reel. Only a portion of the necessary driving sprockets and idler rolls for conveying the film from an unwind reel to a wind-up reel are shown. Likewise only a portion of means for driving the device are shown, for the sake of simplicity, since the film may be conveyed, for example, by such drive sprockets and idler rolls as shown in FIGURES 7 and 8. Path of a chief beam is indicated by line 216, said beam being on the optical axis of the system and passing first into prism 237 whence it is reflected by surface 226 thereof and then by surface 227 thereof, thence through lens 244 and against film 250 at slit 256. Likewise the path of the chief beam on the optical axis of the other optical system, first passing into prism 238, thence being reflected by surface 228 thereof and then by surface 229 thereof out of the prism and through lens 243 and onto film 250 between film gate members 255 is shown by line 213.

Referring again to FIGURES 7 and 8, as the rotating portion indicated generally as 126 of the camera rotates within housing 100 in the direction shown by arrows 113, light passes through opening 142 and through the optical system having axis 116 until opening 142 is occulted by reason of passing behind cylindrical side wall 103. At the time that opening 142 is occulted, opening 141 becomes exposed at the other edge of opening 101 and light starts to pass through the system having optical axis 115, and continues to pass through this system until opening 141 becomes occulted whereupon opening 142 again becomes exposed. Film web 250 is likewise alternately exposed through openings 241 and 242 and the associated optical systems having respectively axes 215 and 216, openings 241 and 242 being alternately occulted by stationary housing 203. Each exposure respectively of systems represented by axes 115 and 116 respectively or 215 and 216 respectively provides one image on film web 150 or 250 in corresponding rectangular portions thereof which will hereinafter be referred to as frames. The sequence of exposure of a series of frames in a film web such as web 50 is shown in FIGURE 10. The first frame portion of film web 50 which is exposed is indicated by brackets 90 exterior thereto and by the numeral 1 superimposed on the web. Likewise, the second frame which is exposed is indicated by the numeral 2 on the web. The third frame exposed is indicated by the numeral 3 superimposed upon one frame portion of the web and so forth, the sequence of frames exposed being indicated through the twentieth exposed frame in similar manner. It may be noted that the sequence of exposure is such that no frame portion of the web is exposed sequentially with respect to either frame portion of the web which is immediately adjacent thereto.

Other suitable sequences for frames in a web of film are shown in FIGURES 11 and 12.

It will be noted upon examination of FIGURES 10, 11 and 12 that it is a requisite of the sequence that the distance between any two frame spaces which are exposed sequentially is an odd number of frame spaces in the web but that the particular numerical value for this odd number is not critical.

A camera may be provided with four lenses in the same manner that the cameras of FIGURES 7 and 8 on the one hand and FIGURE 9 to the other hand are provided with two lenses in order to make possible a reduction in the rotational speed of the camera by a factor of two while increasing the exposure time for any particular increment or frame of the film web by a factor of two and yet at the same time providing the same number of frames per second. Likewise, by the use of four lenses the rotational speed of the camera and the exposure time may be maintained the same but the number of frames per second doubled. This may be accomplished with a single film web by utilizing four lenses, four reflecting systems and four film gates disposed to provide four optical systems and four film gates disposed to provide four optical systems as hereinbefore described but the sequence of frames in the film web becomes much more complex than the sequence shown in FIGURE 10 and is such that it appears necessary to make the motion of the film at least partially intermittent. That is, the velocity of the film web as it travels through the device must apparently be varied to some extent which can be accomplished without serious difficulty by providing film loops between the several film gates and causing the size of these loops to progressively increase and diminish in a suitable manner.

However, these advantages which may be achieved by providing four lenses, i.e., four optical systems, may be achieved in the manner shown in FIGURE 13 wherein two film webs are utilized in the camera. Exposures therein may have sequences as hereinafter described and may be printed as hereinafter described to provide a single film web which may be utilized in a projector in the manner described below, motion of each of the two film webs in the camera of FIGURE 13 being continuous and non-intermittent and the motion in the projector of the single film web made by combining these two film webs also being continuous and non-intermittent, thus permitting high rate of speed with a minimum of wear and tear on the web.

Referring now to FIGURE 13, there is shown a stationary housing indicated generally as 300 having bottom portion 302, cylindrical side wall 303 cut away to provide an opening extending through at least 170° and preferably through 180° around the axis of rotation 345 as shown at 301 and having contained therein suitably mounted by means not shown a rotating housing having a flat bottom portion 331, a cylindrical side portion 332 and flat plate 336 horizontally disposed therein and having mounted thereon mirrors 337 and 338, lenses 343 and 344, film backing plate members 346 and 345 and film gate members 348 and 349 and having rotatably mounted therein shaft 370. The lenses and mirrors are so mounted that the second nodal points in virtual images of the lenses formed by the mirrors fall at axis of rotation 345. Cylindrical side portion 332 may be cut away as at 341 and 342 respectively and plate 336 may be cut away as at 339 and 340 respectively to provide openings to admit light to the optical systems represented by axis 315 and comprising mirror 337 and lens 343 and gate members 349 and the system represented by axis 316 and comprising mirror 338, lens 344 and gate members 348. Film web 350 may be caused to pass from an unwinding reel by means not shown through a loop not shown and then as shown at 358 may pass over idler roll 386 and thence between backing members 345 and gate members 349, thence over idler rolls 387, 388, 389 and 390, thence between backing members 346 and gate members 348, thence over idler roll 391, thence over driving sprocket 392 which may be mounted on shaft 370 which may be rotatably mounted on plate 336 and may have fixedly attached to the bottom thereof, under plate 336, gear 372 which may be driven from stationary gear 322 as the rotating housing is caused to rotate in the direction of the curved arrows and may then pass outward as shown at 359 and pass, if desired, upward to a windup reel, being carried by idlers and sprockets not shown. A second film web 350′ may pass through two other optical systems represented by axes 315′ and 316′, the parts thereof corresponding to the system just described and being indicated with like numerals with prime superscripts.

The sequence of exposure of frames in web 350 is indicated in FIGURE 14 and the sequence of exposure of frames in web 350′ is indicated in FIGURE 15.

In a printing machine of the type conventionally utilized in the motion picture industry, the images carried in the frames of webs 350 and 350′ may be printed on still another web of film indicated as 351 in FIGURE 16, the frame portions of web 351 carrying numerals indicating the frame from 350 or 350′ printed thereon. The sequence of exposure for the several images in web 351 is indicated by the numerals superposed on the frame portions thereof in said web as indicated at 351′ in FIGURE 16.

In this manner a camera comprising four lenses, i.e., four optical systems according to the invention, may be operated with two webs of film each operating continuously to provide, after printing, a single film web utilizable alone in a suitable projector with continuous non-intermittent motion thereof as will be seen hereinafter.

Figure 17:
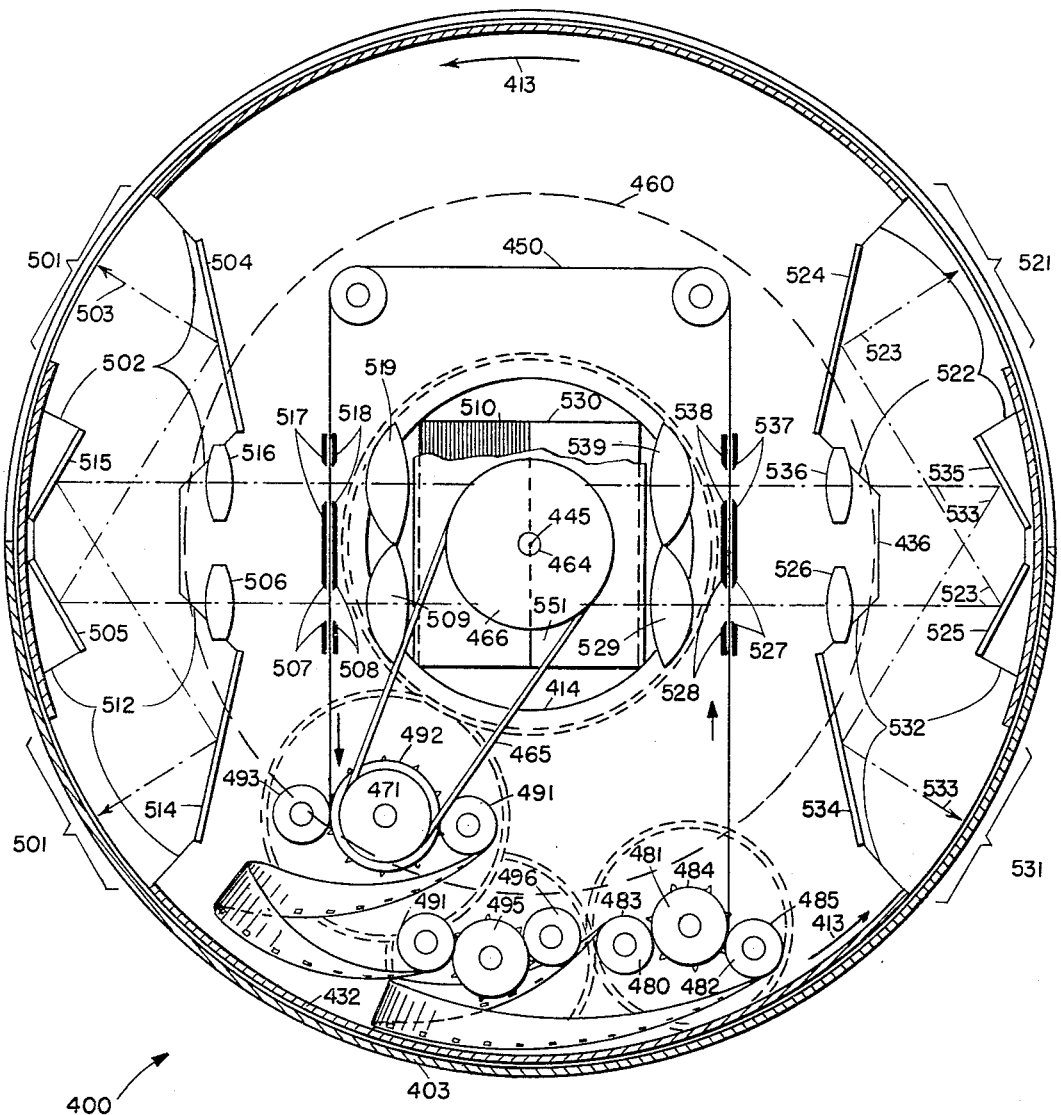
FIGURE 17 is a plan view from above of a projector according to the invention having the top closure portions thereof removed.
Figure 18:
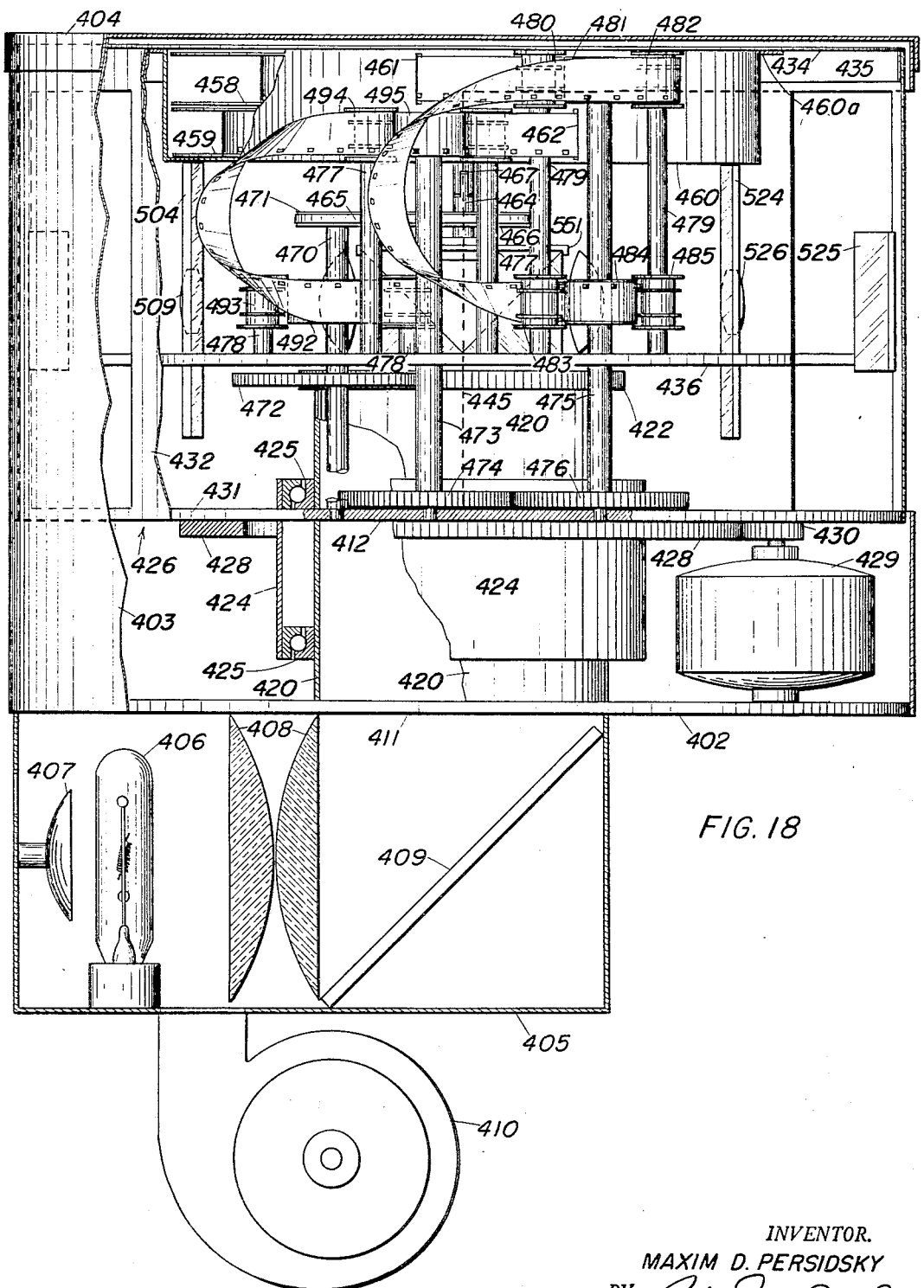
FIGURE 18 is a partially cut-away side elevational view of the projector of FIGURE 17.

Referring now to FIGURES 17 and 18, there is shown a projector for projecting motion pictures in accordance with my invention comprising an outer stationary housing 400 which may be supported by any means adapted to provide a stable mounting therefor, illustration of such means being omitted for the sake of simplicity. Such means preferably provides for suitable tilting of housing 400 so that axis of rotation 445, described below, may be either vertical or tilted from the vertical. Housing 400 may comprise a bottom portion such as flat bottom portion 402, cylindrical side portion 403 and a top portion 404 which may be removable as a lid or closure as shown.

Cylindrical wall or side portion 403 need not be cylindrical as shown but may be square, polygonal, or the like being adapted to provide a housing for the mechanism contained therewithin, the same being true of side portions such as 103, 203 and 303 previously referred to in connection with other figures.

Depending from the bottom of portion 402 of housing 400 there may be provided lamp housing 405 containing lamp or light source 406. An arc or other light source may be utilized in place of lamp 406. Behind light source 406 there may be provided a reflector such as reflector 407 and on the other side of light source 406 there may be provided condensing lenses 408 and mirror 409. Blower 410 may be provided if desired to ventilate the interior of lamp housing 405. Within housing 400 there may be provided a stationary tube 420 firmly attached to plate 402 and there may be rotatably mounted on the exterior of tube 420 and coaxial therewith a tube 424 by means of antifriction bearings 425. A rotatable housing 426 may be fixedly attached to tube 424 and may comprise a flat bottom plate 431, a cylindrical side portion 432 and a top portion 434 which may be flat, as shown, and removable as a lid or closure being held in place laterally with respect to side portion 432 by downwardly extending member 435. Mounted within housing 426 there may be provided a flat plate 436 which may be disposed perpendicular to axis of rotation 445 in a horizontal plane and may be rigidly attached to cylindrical side portion 432. Suitable openings may be provided in plates 402, 431 and 436 at 411, 412 and 414 to provide for upward passage of light from source 406 reflected by mirror 409. Mounted on plate 436 above opening 414 there may be provided two prisms 510 and 530. Also mounted on plate 436 there may be mounted focusing lenses 509, 519, 529 and 539, projection lenses 506, 516, 526 and 536 and mirrors 504, 505, 514, 515, 524, 525, 534 and 535 in such manner that the second nodal points in virtual images of the lenses formed by the mirrors are on axis of rotation 445. The prisms may be provided with a suitable cover plate 551. Plate 431 may have ring gear 423 attached to the under side thereof and housing 426 may be caused to rotate by motor 429, which may be attached to housing 400, acting through gear 430 on gear 428.

Attached to tube 420 on the outside thereof there may be provided gear 422 and rotatably mounted in plates 431 and 436 there may be provided shaft 470 having fixedly attached thereto spur gear 472 and driving sprocket 492 and pulley 471.

Also rotatably mounted in plates 431 and 436 there may be provided shafts 473 and 475 having fixedly attached thereto spur gears 474 and 476 which mesh with each other. Shaft 475 may carry fixedly attached thereto driving sprocket 481 and 484; shaft 473 may carry fixedly attached thereto driving sprocket 495. Idler rolls 491 and 493 may be rotatably mounted on shafts 478 which may be removably or slidably attached to plate 436. Idler rolls 494 and 496 may be rotatably mounted on shafts 477 which may be slidably, removably, securely attached to plate 436. Upper idler rolls 480 and 482 and lower idler rolls 483 and 485 may be rotatably carried on shafts 479 which may be removably or slidably attached securely to plate 436. Rotatably mounted on a suitable bearing block on top of prism cover plate 551 there may be provided shaft 464 which may carry fixedly secured thereto pulley 466 which may be adapted to be driven through belt 465 by pulley 471.

Film reel housing 460 may be provided depending from cover plate 434 and may be removably attached thereto by such means as screws or clamps (not shown) which may attach flange 460a to member 434. Housing 460 may contain therewithin unwind reel 458 and wind-up reel 459 which may be mounted on suitable means within housing 460 to provide for drag or brake action on reel 458 by means well known and not illustrated and to provide for rotation of each of the reels with respect to the housing and with respect to each other with a minimum of friction thereinbetween. Reel 459 may be mounted to be driven by a suitable portion of shaft 467 engaged therewith. Shaft 467 may project downwardly through housing 460 into interlocking engagement with upwardly projecting shaft 464 to be driven thereby.

The position occupied by housing 460 vertically above the elements shown in FIGURE 17 is indicated by the dashed lint 460.

Film 450 may pass from reel 458 and may thence pass from the interior to the exterior of housing 460 through the slit 461, may thence pass over idler 480, thence between idler 480 and sprocket 481, thence over sprocket 481, and then between sprocket 481 and idler 482, thence downwardly in a loop and then over idler 483 and between idler 483 and sprocket 484 and then over sprocket 484 and between sprocket 484 and idler 485, thence between film gate parts 528 and film gate parts 527, thence between film gate parts 538 and parts 537, thence over idlers 486 and 487, thence between film gate parts 517 and 518, thence between film gate parts 507 and 508, thence between idler 493 and sprocket 492, thence over sprocket 492 and then between sprocket 492 and idler 491 and then over idler 491 and upwardly in a loop, then between idler 494 and sprocket 495, thence over sprocket 495 and then between sprocket 495 and idler 496, then over idler 496 and then back into housing 460 through slit 462 and onto reel 459. To wind up the film, reel 459 may be driven through shaft 467 by belt 465 acting on pulley 466 attached to shaft 464. The ratio of sizes of pulleys 471 and 466 and of the gearing driving shaft 470 are such that reel 459 is constantly urged to wind up at a rate greater than the rate of travel of the film thereonto and compensation for the varying diameter according to the film wound thereon is provided by slippage of belt 465 on either or both of the pulleys on which it runs. The rate of film travel is determined by pulling driving sprocket 493. The rate of film withdrawal from reel 458 is determined by driving sprocket 481 which in turn rotates in accordance with the rotational speed of shaft 475. Shaft 475 is caused to rotate by sprocket 484 which in turn is rotated by film passing thereover as it is pulled through the film gate by the action of sprocket 492. Thus the rate of travel of the film over sprockets 481 and 484 is exactly equal causing the film loop thereinbetween to be maintained and by reason of the engagement of gear 476 with gear 474 the rate of travel of the film over sprocket 495 is likewise the same, thus causing the film loop between idler 494 and idler 491 to be properly maintained.

As housing 426 rotates in the direction shown by arrows 413, light from source 406 passes through lenses 408, thence is reflected upwardly by 409, through openings 411, 412 and 413, and then is reflected outwardly through lenses 509, 519, 529 and 539 and then through the film at the film gates. During a portion of the rotational cycle openings in side wall portion 432 such as 501 and 511 are closed and light cannot pass out therethrough. Light passes outwardly through the optical systems represented by optical axes 523 and 533 passing, for example, through lens 529 where it is focused onto the film gate between portions 527 and 528, thence outwardly through projection lens 526 being reflected by mirror 525 and then by mirror 524 and thence outwardly through opening 521.

Suitable portions are cut out from side walls 432 at 501, 511, 521 and 531 and suitable portions are cut out from plate 436 as indicated at 502, 512, 522 and 532 to provide for passage of light in the respective optical systems having the optical axes represented by the lines 503, 513, 523 and 533.

The optical systems represented by axes 523 and 533 project different portions of a single frame at the same time; the beams projected on these axis sweep the screen successively so that the screen image is illuminated twice whereas if one of the two systems be omitted the device works equally well but only one half as much light is cast on the screen; in other words each frame is scanned twice by reason of the presence of two optical systems disposed with their film slits spaced laterally a distance less than a frame length. It should be clearly understood that the distance between the film gate is substantially less than the length of a frame.

For example, as opening 521 passes from behind side wall portion 403 the beginning of a frame starts to pass through the film gate provided by members 527 and 528. As opening 521 then passes from behind housing 403 the beginning of the same frame begins to pass through the film gate between parts 537 and 538 and this same portion of the frame is projected on the screen again for a second time. By thus doubly scanning and projecting each frame, twice as much light is caused to pass through the frame and the screen illuminated to twice as great an extent. Furthermore, flickering or the appearance of flickering is reduced.

A projector in accordance with the invention such as the projector of FIGURES 17 and 18 when in operation projects images of spaced apart portions of the film at intervals approximating the image retention period of the eye or preferably at intervals of less than the image retention period of the eye.

It should be noted that in the projector as well as in the camera the lenses and the reflecting surfaces are so placed that a virtual image of each projection lens formed by the reflecting surface or surfaces associated therewith has its second nodal point on the axis of rotation.

It may now be pointed out that the camera of FIGURES 7 and 8 or the camera of FIGURE 9 may be suitably utilized as a projector by providing a satisfactorily collimated source of light for projection purposes behind each of the film gates provided by parts 154 and 149 and providing a suitable aperture in each of backing plates 147 and 148 in the one case so that light may pass outwardly through the film, thence through lenses 143 and 144 respectively and thence being reflected by mirrors 137 and 138 respectively onto a screen. Likewise by providing a suitable collimated source of light behind each of slits 255 and 256, an image in an exposed and developed film web 250 may be projected through lenses 243 and 244 and prisms 237 and 238 respectively onto a screen.

A primary and important advantage of the projector of FIGURES 17 and 18 over the projectors which are provided by use of the cameras of FIGURES 7 and 8 and FIGURE 9 respectively is, as previously mentioned, the provision of a greater amount of light on the screen and a reduction of flickering due to the rapidity (twice as great) with which light is cast on the screen.

Figure 19:
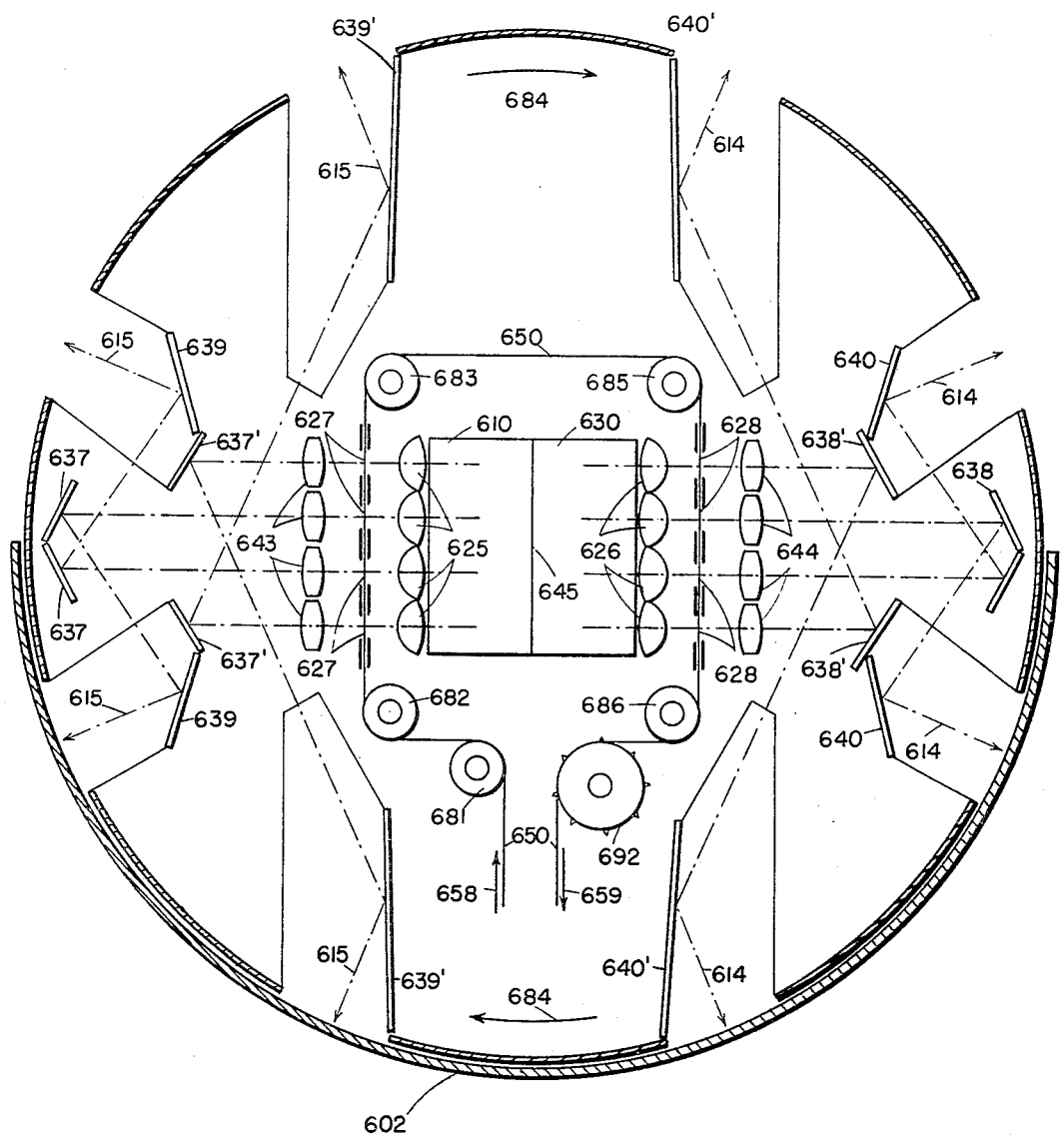
FIGURE 19 is a schematic plan view from above of another embodiment of a projector according to the invention.
Figure 20:
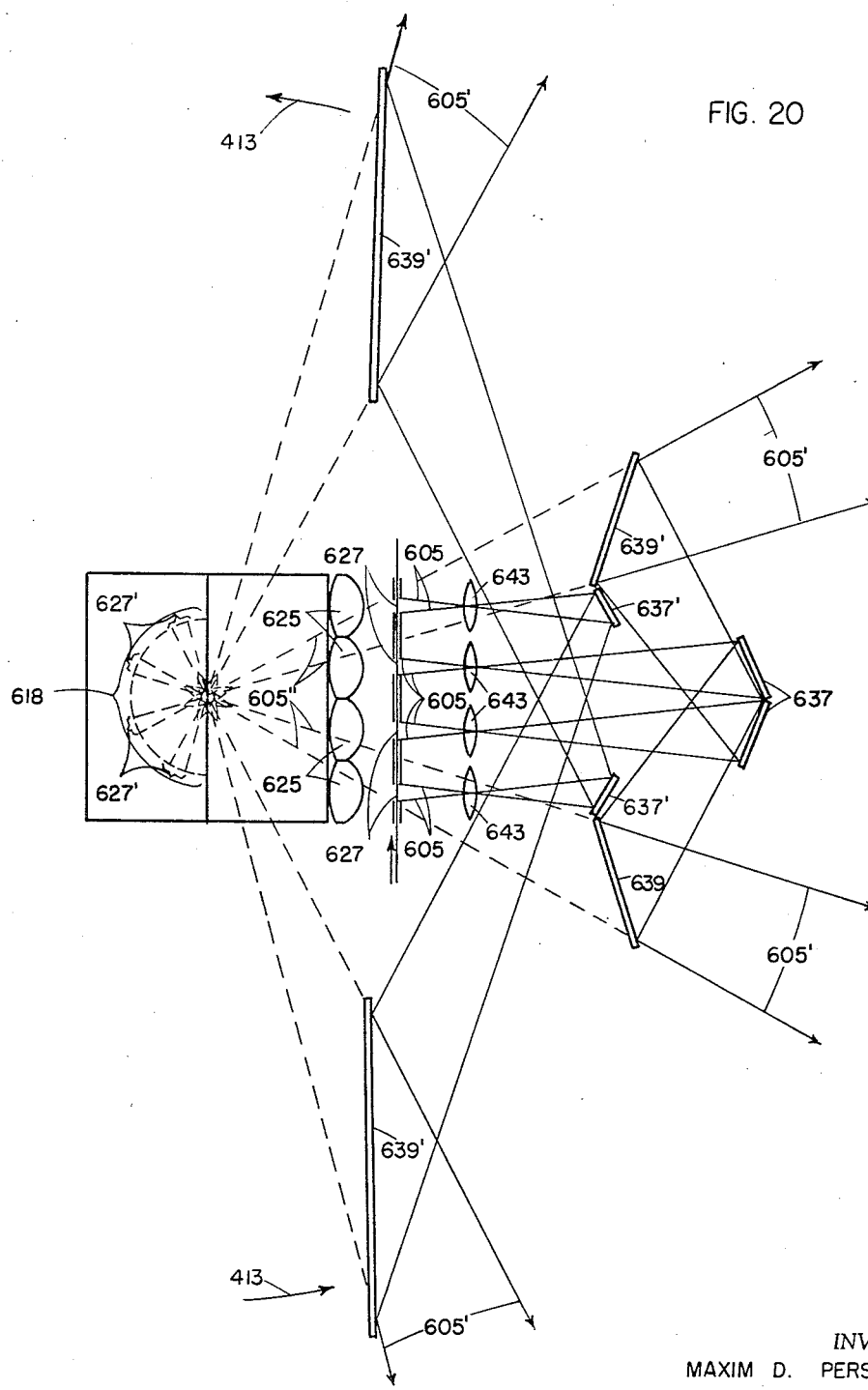

Whereas the provision of four projecting lenses or four optical systems in a projector as shown in FIGURES 17 and 18 is desirable, an even greater number such as eight may be provided in a projector as shown in FIGURE 19 and, as shown in FIGURE 20, the elements of the optical systems in such a projector may be so arranged that the virtual images of the projection lenses formed by the mirrors in each of the systems fall with their second nodal points at the axis of rotation.

Both cameras and projectors according to the invention are adapted to be rotated at such speeds that successive images are either taken or projected at intervals of preferably no more than the image retention period of the eye which is normally regarded as $\frac{1}{16}$ second.

As shown in FIGURE 19 there may be provided a stationary housing 602 which may be cylindrical as shown which may have contained therewithin a rotating projector mechanism adapted to rotate as shown by arrows 684 about axis of rotation 645, said mechanism being indicated generally as 626, which may comprise flat plate 631 and outer wall portion 632. Mounted on plate 631 above a suitable opening therein there may be provided prisms 610 and 630. Below prisms 610 and 630 there may be provided a source of light, not shown, adapted to throw light upward into the prisms. Light passing vertically into prisms 610 and 630 may be reflected outwardly through focusing lenses 625 and 626, thence through film gates 627 and 628, thence through projection lenses indicated as 643 and 644, thence against small mirrors such as mirrors 637, 637', 638 and 638', thence against larger mirrors such as 639, 639', 640 and 640' onto a screen in the manner shown, for example, in FIGURE 25 or 26. The path of an axial beam of light from each of lenses 643 and 644 is indicated by lines 614 and 615.

Film web 650 may be caused to pass through the projector of FIGURE 19 by the pulling action of driving sprocket 692 which may deliver the film in the direction shown by arrow 659 to a wind-up reel, not shown. The film may be pulled from an unwind reel, not shown, in the direction shown by arrow 658, thence over idlers 681 and 682, thence through film gates 627, thence over idler rolls 683 and 685, thence through film gate 628 and thence over idler 686 into engagement with sprocket 692.

Prisms 610 and 630 may, if desired, be so arranged that light source may be located above rather than below the prisms and light may pass vertically downward instead of vertically upward and thence be reflected outwardly.

Each of the projectors described herein is preferably located to project on a cylindrically or otherwise more or less curved screen and is preferably located at or near the center of curvature of such screen.

Although the outer stationary housings of both camera and projector have been described as being cut away to provide an opening extending through 180° about the axis of rotation, such opening may subtend a narrower angle such as, for example, 170° or 160° and both cameras and projectors will perform equally well. The screen for such projectors may subtend an angle of, accordingly, 170° or 160° for projectors having such housing.

Figure 26:
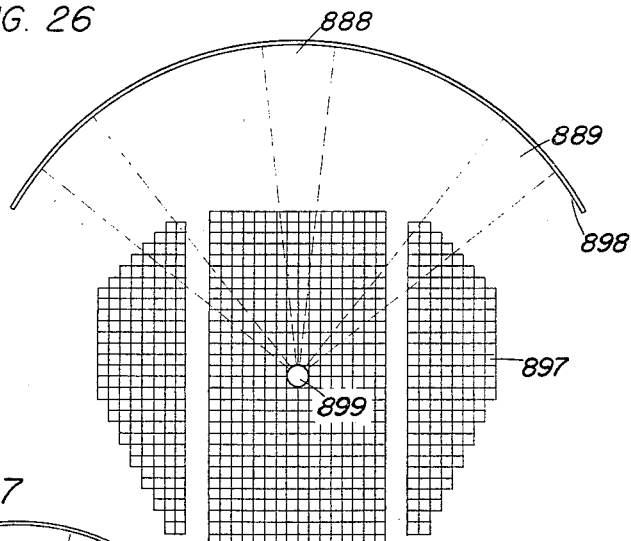
FIGURE 26 is a schematic plan view of a theater provided with a projector according to another embodiment, adapted to project motion pictures through a view of about 160°, said motion pictures containing frames exposed through the same field of view or a wider field of view, for example, 180°.

If desired a picture taken through an angle of 180° may be projected on a screen through an angle of say 170° or 180° as shown in FIGURE 26, though to accomplish this it is necessary to carefully print each of the webs taken through 180° with gaps between frames.

As shown in FIGURE 20, light passing through film gates 627 as shown by chief rays 605 passes through lenses 643, thence against small mirrors 637 and 637', thence against large mirrors 639 and 639' and thence toward a screen, not shown, as shown at 605'. As shown by the dotted lines 605" the equivalent light path of the rays is homocentric with the axis of rotation 645, the mirrors being arranged so that the virtual images of lenses 643 are as at 643' with their second nodal points at said axis of rotation. With respect to such virtual image position of the lens the circular dotted line 617 represents the position of the film and the extent of one frame in the film is indicated by brackets 618 and the position of film gates with respect to the frame is represented at 627'.

Figure 21:
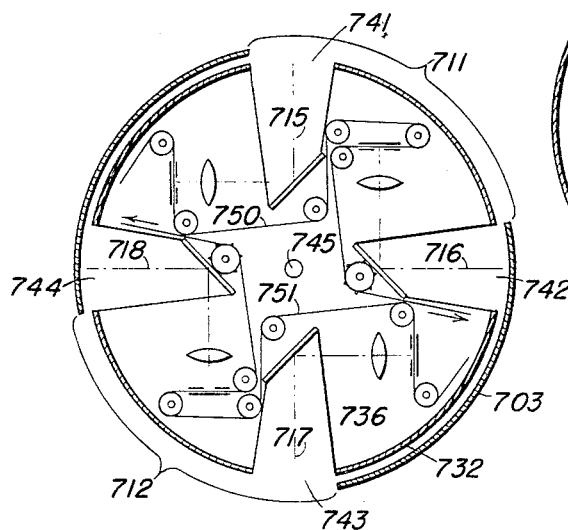
FIGURE 21 is a somewhat schematic plan view from above of a camera according to another embodiment of the invention having the top closure portions thereof removed.
Figure 22:
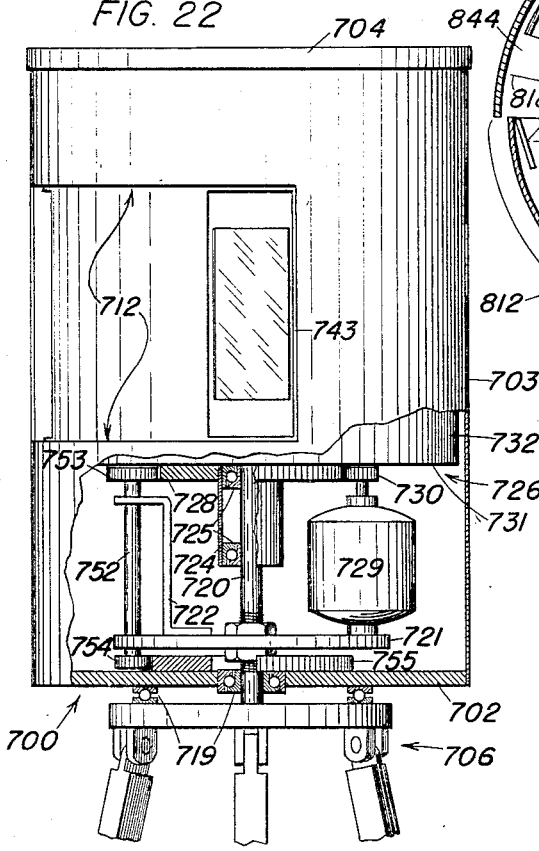
FIGURE 22 is a partially cut-away side elevational view of the camera of FIGURE 21 having the top closure portion in place.

Referring now to FIGURES 21 and 22, wherein there is shown a camera adapted to take pictures through a field of view of 360°, an outer housing indicated generally as 700 is rotatably mounted by a suitable means such as antifriction bearings 719 on a tripod 706 or other suitable mounting means adapted to provide a relatively rigid stable base. Housing 700 may comprise a bottom portion 702 which may be a flat plate as shown, an outer side enclosure portion 703 which may be cylindrical as shown and a top portion 704 which may be disposed as a lid or closure engaged with the upper peripheral edge of portion 703, as shown. Side enclosure 703 is cut away as 711 and 712 to provide two openings each extending through 90° around the axis of rotation 745. A rigid stationary member 720 may extend upwardly within housing 700. Mounted on 720 there may be provided rigid stationary brackets 721 and 722. Rotatably mounted therein there may be provided vertical shaft 752 which may be provided at its top end with gear 753 fixedly attached thereto and at its bottom end with gear 754 fixedly attached thereto. Gear 754 may engage gear 755 which may be fixedly attached to bottom portion 702 of housing 700.

Mounted rotatable on member 720 by suitable means such as antifriction bearings 725 there may be provided tube 724 coaxial with axis of rotation 745 and attached to said tube there may be provided the inner rotatable housing indicated generally as 726 comprising a bottom portion which may be flat plate 131, as shown, a preferably cylindrical side portion 732 and a preferably flat top portion which for the sake of simplicity is not shown, but which may be comparable or identical to portion 134 and may be provided with means for containing rotatably suspended film reels therein, such as housing 160. Fixedly attached to tube 724 or bottom portion 731 or both there may be provided gear 728 which may engage with gear 753 and may be driven through gear 730 by motor 729 mounted on rigid stationary bracket 721.

As gear 728 therefore is caused to rotate (to cause housing 726 to rotate), it at the same time drives gear 755 through gears 753 and 754 on shaft 752 and causes housing 700 to rotate in the same direction. A suitable number of teeth is provided on each of gears 728, 753, 754 and 755 so that the rotational speed of housing 700 is one half that of the speed of housing 726.

Mounted horizontally with respect to axis 745 there is provided flat plate 736 within housing 726 and mounted thereon there is a plurality of reflecting surfaces, lenses and film gate members adapted to provide four optical systems designated respectively by the optical axes 715, 716, 717 and 718, said elements being arranged so that the virtual images of the lenses formed by the reflecting surfaces in each of said systems fall with their second nodal points at axis of rotation 745 as hereinbefore described. Side portion 732 of housing 726 is cut away at 741, 742, 743 and 744 and plate 736 is correspondingly cut away as hereinbefore described to provide access of light for limited controlled periods of time to each of said optical systems in a suitable sequence. The elements of said optical systems are suitably mounted on plate 736 together with suitable sprockets and idler rolls as hereinbefore described, to provide for travel of film webs 750 and 751 through said film gate members spaced and located in suitable positions to receive images focused thereon by said lenses.

By reason of the rotation of housing 726 and the rotation at half the speed thereof of surrounding housing 700, film webs 750 and 751 which may be caused to pass through said optical systems, by means not shown comparable to means hereinbefore described, at a speed identical to the speed of motion of the images shown by said lenses, may be caused to receive in suitable sequence images covering frames each taken through a field of 180° but spaced around the axis 90° from each other and combinably covering a field of 360°.

Figure 23:
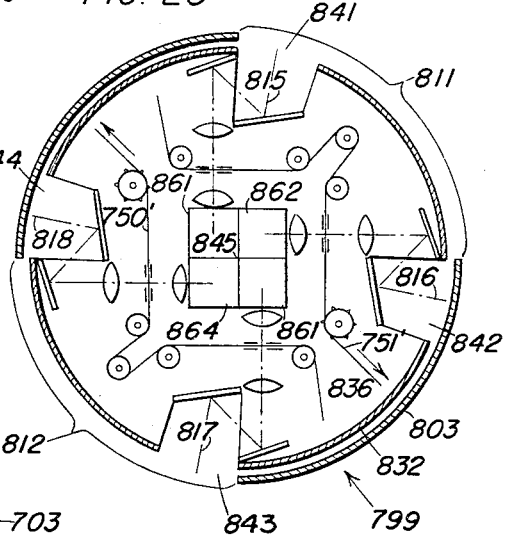
FIGURE 23 is a somewhat schematic plan view from above of a projector according to the invention adapted to project film exposed in the camera of FIGURES 21 and 22, the top closure portions thereof being removed.
Figure 27:
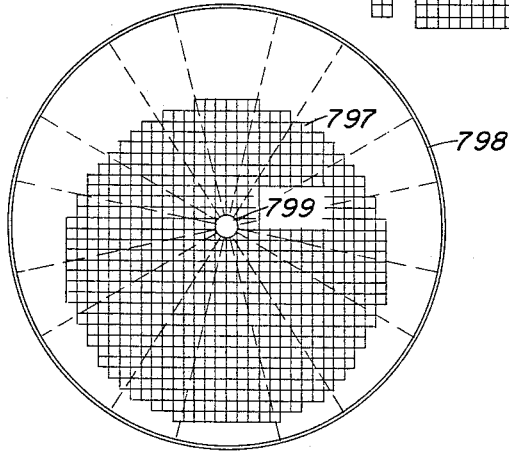
FIGURE 27 is a schematic view of a theater provided with a projector according to another embodiment, adapted to project motion pictures through a field of view of 360°.

Such webs after being suitably developed may be projected on a screen to provide motion pictures through a field of view of 360° as shown schematically in FIGURE 27 in a suitable projector such as the projector indicated generally as 799 in FIGURE 23. As shown schematically in FIGURE 27 a projector such as projector 799 may be rigidly mounted within a theater having a circular screen 798 and a plurality of seats 797 contained therewithin. In order to provide for maximum seating capacity and minimum of interruption to the field of view of the members of the audience, projector 799 may suitably be rigidly mounted on rigid members extending from the ceiling of the theater which for the sake of simplicity are not shown, and may thus be suspended above the heads of the members of the audience.

Referring now to FIGURE 23, there is shown a projector indicated generally as 799 which comprises an outer rotating housing member 803 cut away at 811 and 812 respectively through 90° around axis of rotation 845. Within housing member 803 there is provided rotating housing member 832. Members 803 and 832 may be caused to rotate by means similar to those described in connection with portions 703 and 732 in FIGURES 21 and 22 so that housing member 832 rotates at twice the speed of housing member 803.

Mounted on horizontal plate 836 which may be provided within housing member 832 there may be provided lenses, reflecting surfaces, and film gate members to provide four optical systems respectively represented by optical axes 815, 816, 817 and 818, the elements thereof being so located as to cause the virtual images of the lenses formed by the reflecting surfaces to fall with their second nodal points on the axis of rotation 845 and housing side wall portion 832 may be cut away at 841, 842, 843 and 844 as hereinbefore described in connection with other embodiments, and plates 836 may likewise be suitably cut away as hereinbefore described in connection with other embodiments, to provide for access of light to the elements of each of the optical systems. In conjunction respectively with each of the optical systems represented by axes 815, 816, 817 and 818 there may be provided prisms 861, 862, 863 and 864 which may reflect outwardly there through light (from a light source not shown) which may enter said prisms vertically from either above or below the prisms, the prisms of course being provided with reflective surfaces suitably oriented. Film webs 750' and 751' which may correspond to film webs 750 and 751 after being developed, may each be caused to pass from a reel through two of the optical systems and thence onto another reel by suitable drive sprockets and idler rolls as hereinbefore described in connection with other embodiments and in part not shown for the sake of simplicity, said webs being caused to pass in conjunction with film gate members at a suitable distance between the lenses of said optical systems to project images on a screen such as screen 798, as shown in FIGURE 27.

Figure 24:
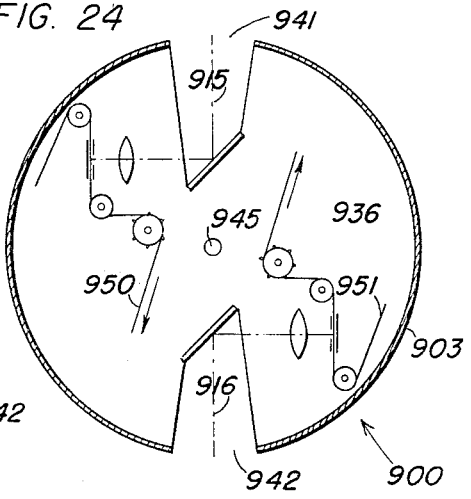
FIGURE 24 is a somewhat schematic plan view from above of another embodiment of a camera according to the invention adapted to take motion pictures through a field of view of 360°, having the top closure portions thereof removed.

Referring now to FIGURE 24 there is shown another embodiment of a camera adapted to take motion pictures on two continuously non-intermittently advancing film webs 950 and 951 through a field of 360° which may then, after being developed, be projected from a suitable projector in a suitable theater such as that of FIGURE 27, said camera being indicated generally as 900. Said camera comprises a single rotating housing having a side enclosure portion 903 which may be cylindircal as shown and which is substantially devoid of a housing extending therearound and entirely devoid of any means causing a substantial interruption of entrance of light into openings 941 and 942 cut in the outer surface thereof. Horizontally mounted with respect to axis of rotation 945 of portion 903 and fixedly attached to the latter there may be provided flat plate 936 which may have mounted thereon reflecting surfaces, lenses and film gate members which may provide the optical systems represented by the optical axes thereof 915 and 916 and which may be adapted to have pass therethrough respectively, film webs 950 and 951 from unwind reels and to wind-up reels which for the sake of simplicity are not shown, the film webs being driven and carried by means which are only partially illustrated and such as have been fully described in connection with other embodiments. The optical elements of each of the systems represented by axes 915 and 916 as hereinbefore fully described are disposed so that the virtual images of the lenses therein formed by the reflecting surfaces therein fall with their second nodal points at axis of rotation 945.

A substantially continuous frameless image is provided on each of webs 950 and 951.

After being developed the webs may suitably be projected in the theatre such as that of FIGURE 27 by use of a projector such as that of FIGURE 17 or FIGURE 19 with the exception that outer stationary enclosure portions 402 and 602 are either entirely cut away through 360° or are entirely removed.

Figure 25:
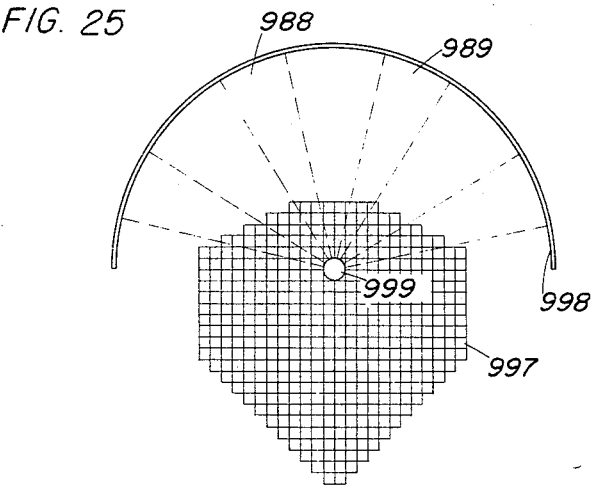
FIGURE 25 is a schematic view of a theater provided with a projector according to one embodiment, adapted to project motion pictures through a field of view of 180°.

Referring now to FIGURE 25 there is shown schematically a theatre comprising a hemi-cylindrical screen 998 extending through 180° with respect to a projector 999 which may be the projector of FIGURE 17 or the projector of FIGURE 19 or another suitable embodiment of projector according to the invention. Members of an audience to view said pictures may be seated in seats 997. Projector 999 may be attached to the ceiling in the manner and for the same reasons as described in connection with projector 799 in FIGURE 27. Dotted lines represent beams of light such as 989 and 988 sweeping the screen.

Referring now to FIGURE 26, there is shown a screen 898 which may have the form of a portion of a cylindrical surface as shown and may extend through about 160° around the axis of rotation of projector 899 at a more or less substantially constant radial distances therefrom. Projector 899 may be mounted above an audience which may be seated in seats 897 as described in connection with the embodiment of FIGURES 25 and 27. Beams of light 888 and 889 projected from projector 899 may sweep or scan screen 898. In some cases a film may be utilized in projector 899 which has been taken in a camera having a field of view extending through 160°. However, in another embodiment, film may be utilized in projector 899 which has been taken in a camera such as the camera of FIGURES 7 and 8 and wherein each frame thereof has been taken through a field of view 180°. The theatre may be comparable to that of FIGURE 25, except that the radial distance from projector to screen is increased and the angle substended by the screen with respect to the projector is reduced. The areas of the images projected on the screen may be of the same size in the embodiment of FIGURE 26 as in the embodiment of FIGURE 25 if screen 898 is, as shown, an arc having a length along the curve equal to that of screen 998. In such case the frames of the film may be identical to those utilized in the embodiment of FIGURE 25 with the exception that it may be desirable to reprint the film to provide a space between each of the frames therein.

Figure 29:
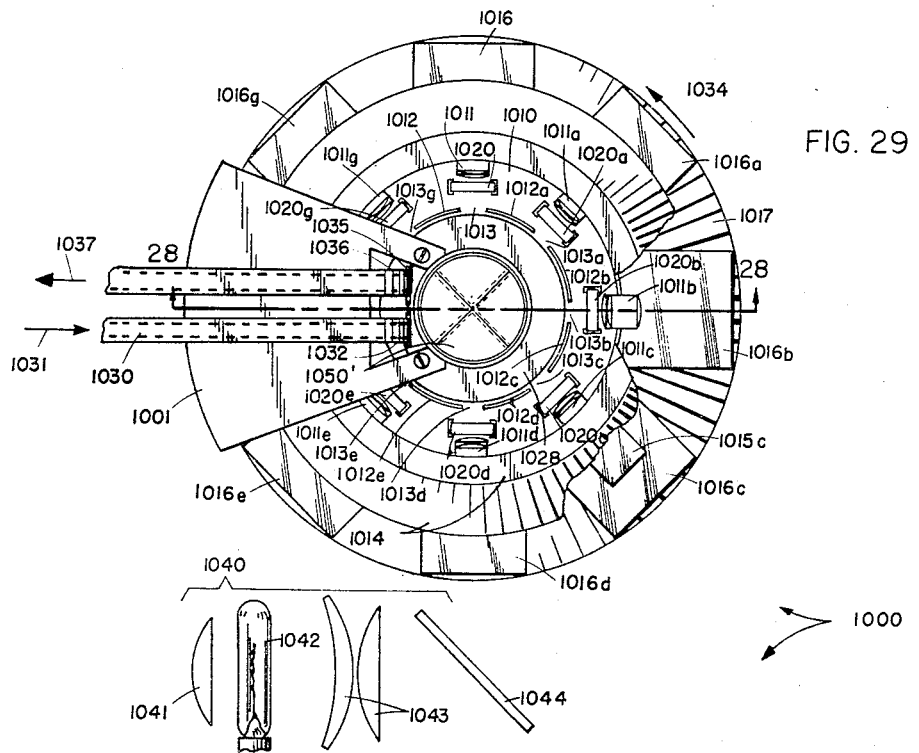
FIGURE 29 is a partially cutaway, partially schematic plan view of the embodiment of FIGURE 28.
Figure 28:
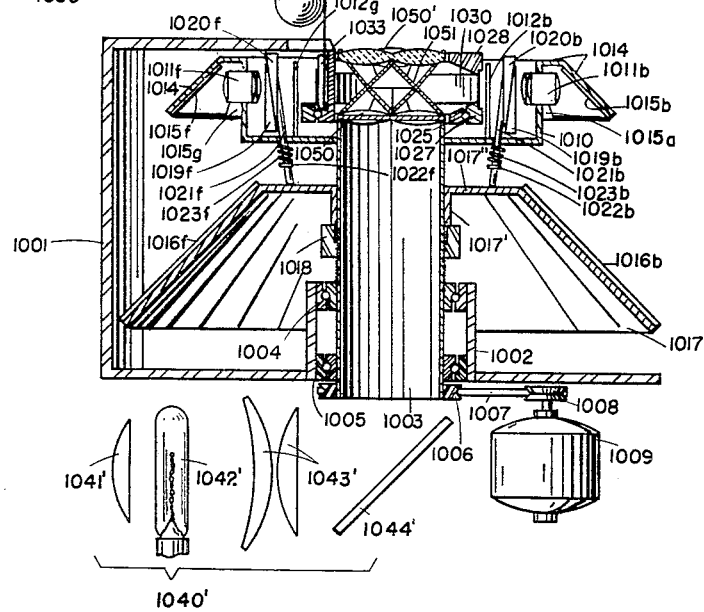
FIGURE 28 is a cross-sectional, partially schematic elevation of one embodiment, taken on lines 28—28 in FIGURE 29.

Another embodiment in accordance with the invention is shown in FIGURES 28 and 29 and portions of this embodiment are shown in FIGURES 30–34. This embodiment is provided as a projector indicated generally as 1000, adapted to project through 320°. If it weren't for the fact that some structure is necessary for the film runs which enter and leave the device and to support the projector and provide space for the projectionist, the embodiment could be adapted to project through 360°. That is to say, optically it is adapted to project through 360° but mechanically it is found practical to limit its projection angle to on the order of from 300° to 330°. In the device of FIGURES 28 and 29, eight lenses are provided with their axes disposed in a horizontal plane which is disposed horizontally with respect to the axis of rotation of tube 1003, each axis being on a radius with respect to such axis, each of the eight lenses being angularly disposed equidistant with respect to each other. Supporting member 1001 may be supported stationarily and rigidly from a floor or lower base or tripod which for simplicity is not shown. Upwardly extending tube 1002 may be provided as a portion of member 1001. Upwardly extending tube 1003 may be supported to rotate within tube 1002 by bearings 1004 and 1005 therebetween. To provide for rotation of tube 1003 it may be provided at its lower end with a sheave 1006 which may be driven by belt 1007 trained over sheave 1008 which is driven by motor 1009. Supporting bracket 1010 preferably extends from tube 1003 to support lenses 1011, 1011a, 1011b, 1011c, 1011d, 1011e, 1011f and 1011g. Also extending from support 1010 there may be provided upwardly extending members 1012, 1012a, 1012b, 1012c, 1012d, 1012e, 1012f and 1012g to provide film gates 1013, 1013a, 1013b, 1013c, 1013d, 1013e, 1013f and 1013g. Extending outwardly and thence downwardly from a portion of 1010 located above the lenses, there may be provided mirror supporting portion 1014 and attached to the underside thereof, there may be provided a plurality of small flat mirrors 1015, 1015a, 1015b, 1015c, 1015d, 1015e, 1015f and 1015g. Most for simplicity are not shown. Thus in FIGURE 29 portion 1014 is cutaway to show small mirror 1015c opposite lens 1011c and in FIGURE 28 small mirrors 1015g and 1015a may be seen disposed opposite lenses which cannot be seen and portions of small mirrors 1015f and 1015b may be seen opposite respective lenses 1011f and 1011b. Mirrors 1015, 1015a, 1015b, 1015c, 1015d, 1015e, 1015f and 1015g are preferably disposed at substantially 45° with respect to the optical axes of the lenses.

Disposed below each of small mirrors 1015, 1015a, 1015b, 1015c, 1015d, 1015e, 1015f and 1015g there may be provided one of the large flat mirrors 1016, 1016a, 1016b, 1016c, 1016d, 1016e, 1016f and 1016g corresponding to each of the small mirrors. Each of the large mirrors 1016, 1016a, 1016b, 1016c, 1016d, 1016e, 1016f and 1016g may be supported on any suitable supporting member such as the conical member 1017, which as shown extends from and is supported from tube 1003. Suitably, tube 1003 may be provided with a threaded external surface to receive internally threaded collar 1018 which, when suitably rotated with respect to tube 1003, moves upwardly or downwardly on tube 1003. Tubular portion 1017' of support 1017 may be slidably received on the exterior of tube 1003 so that it is vertically supported by collar 1018 and moves up and down in accordance with the vertical movement of collar 1018.

Supported from supporting member 1010 by means not shown and disposed stationarily between each of the lenses and its associated film gate there may be provided small wedges 1019, 1019a, 1019b, 1019c, 1019d, 1019e, 1019f and 1019g disposed within the correspondingly subscripted film gates and lenses. For simplicity, only two are shown. These are seen at 1019f and 1019b in FIGURE 28.

In contact with each of wedges 1019, 1019a, 1019b, 1019c, 1019d, 1019e, 1019f and 1019g there may be provided corresponding preferably identically shaped wedges 1020, 1020a, 1020b, 1020c, 1020d, 1020e, 1020f and 1020g, of which, for simplicity, most are not shown. Each pair of wedges, for example, wedges 1019f and 1020f, is preferably symmetrical so that with slanting faces in contact, opposite faces of each block or plate provided by a pair of wedges are optically parallel and perpendicular to the axis of the optical system in which each pair is interposed. Each of wedges 1020, 1020a, 1020b, 1020c, 1020d, 1020e, 1020f and 1020g is preferably mounted by means not shown to slide up and down with its sliding surface in contact with the corresponding sliding surface of the corresponding member of wedges 1019, 1019a, 1019b, 1019c, 1019d, 1019e, 1019f and 1019g. Means to operate each of wedges 1020, 1020a, 1020b, 1020c, 1020d, 1020e, 1020f and 1020g to provide for such sliding motion may be provided, for example, by a rigid member extending from each of the wedges through suitably provided holes in supporting member 1010 into contact with an upper flat surface of supporting member 1017. If member 1017 is rigidly attached to tube 1003, they may contact the upper surface of a ring threadedly attached to tube 1003 above member 1017 in the manner of collar 1018, collar 1018 being then omitted. Such members may be provided as shown for wedges 1020f and 1020b as members 1021f and 1021b which may be rigidly attached at the upper end of each to wedges 1020f and 1020b respectively, may be slidably received in holes in member 1010 as shown and the lower ends of which may be in frictional contact with upper surface 1017" of member 1017 or a ring which may be substituted therefor as mentioned above. Each of members 1021, 1021a, 1021b, 1021c, 1021d, 1021e, 1021f and 1021g, as shown for 1020f and 1020b, may have an extending portion 1022, 1022a, 1022b, 1022c, 1022d, 1022e, 1022f and 1022g shown for 1021f and 1021b as 1022f and 1022b and springs 1023, 1023a, 1023b, 1023c, 1023d, 1023e, 1023f and 1023g, of which only 1023f and 1023b are shown, may be received respectively on each of the members 1021, 1021a, 1021b, 1021c, 1021d, 1021e, 1021f and 1021g to act against such outstanding portion to bias the member downwards and thereby bias wedges 1020, 1020a, 1020b, 1020c, 1020d, 1020e, 1020f and 1020g downwards.

Rotatably supported with respect to tube 1003 by bearing 1025, there may be provided film supporting member 1027 which may rotate on said bearing with respect to tube 1003. Film supporting portion 1028 may be stationary and may be supported from arms which extend from portion 1001 as shown in FIGURE 29. Film web 1030 may enter the device as shown by arrow 1031, may thence pass downwardly over sprocket 1032 which is supported from member 1001 by means not shown and may thence be trained into conjunction with the outer portion of members 1027 and 1028 by passing over slanted roller or bar 1033. Tube 1003 and the members supported therefrom any rotate in the direction shown in FIGURE 28 by arrow 1034 and member 1027 with film carried thereby may rotate in the same direction but at a higher speed, while the lower edge of film web 1030 is in contact with member 1027 and is stationary with respect thereto and the upper inner portion of film web 1030 slides along a suitably provided groove in member 1028. The film web 1030 passes out of conjunction with members 1027 and 1028 at 1035 where it passes over a second diagonally oriented roller or bar, thence passes upwardly to sprocket 1036 and thence out of the device as indicated at arrow 1037. The film is driven by and its velocity is determined by conventional sprocket drive means which may be out of the field of the figures or may be supported by member 1101 and for simplicity are not shown. The same is true of reels for the film entering and leaving the device.

The frames provided on the film by this device are sequential.

That portion of device 1000 which comprises the parts described and designated up to this point may be utilized as a camera if suitable light excluding members, not shown, are added. If however, it is desired to provide the device as a projector, it may be provided with two projection lamp systems 1040 and 1040' which may comprise respectively mirrors 1041 and 1041', lamps 1042 and 1042', condensers, 1043 and 1043' and mirrors 1044 and 1044'. Such systems comprising filament type lamps may be replaced with systems utilizing arc lamps if desired. Systems 1040 and 1040' may be stationarily supported from means not shown and mirrors 1044 and 1044' may be stationarily disposed respectively to direct respective beams downward and upward along the axis of tube 1003. Disposed at the upper end of tube 1003, supported therefrom and attached thereto, there is provided means to distribute the light provided by the beams from systems 1040 and 1040' to lenses 1011, 1011a, 1011b, 1011c, 1011d, 1011e, 1011f and 1011g, said means being more fully shown and described in FIGURES 30 to 34. As indicated in FIGURES 28 and 29, this means comprises a lower composite bulls-eye lens 1050 and upper composite bulls-eye lens 1050' and beam spreader 1051 disposed therebetween. Lens 1050' may be identical with lens 1050.

Referring now to FIGURES 30 to 32, each quarter segment of lens 1050 indicated as 1052, 1052' 1052", and 1052'" may constitute a portion of a symmetrical biconvex lens normally referred to as a bulls-eye lens. Each of these, if provided as a full circular symmetrical lens would have the outline indicated respectively by the four dotted circles respectively 1053, 1053', 1053" and 1053'". The purpose of each of composite lenses 1050 and 1051 is to divide the incident beam of projection light into substantially four separate converging beams. The eight beams provided by the lenses 1050 and 1051 are directed against beam splitter 1051 which comprises eight interlocking flat mirrors arranged in the form of two interlocking tetrahedral pyramids, the apex of one pyramid being disposed upwardly and the apex of the other pyramid being disposed downwardly. Thus flat mirrors 1054, 1054', 1054" and 1054''' may comprise a tetrahedral pyramid with its apex directed upwardly and having cut out portions near its lower edges at 1055, the reflecting surfaces of this pyramid being disposed in FIGURE 33 to be seen by the viewer. Interlocked with the thus described pyramid there may be provided a second set of four mirrors arranged as a tetrahedral pyramid having its apex directed downward. Flat mirrors 1056, 1056', 1056" and 1056''' may provide such an arrangement. The dull and non-reflective sides of mirrors 1056, 1056', 1056" and 1056''' are seen in FIGURE 33 whereas the reflective side of mirror 1056" and the dull side of mirror 1056 are seen in FIGURE 34. The four beams provided by composite lens 1050' may impinge downwardly on the surface of mirrors 1054, 1054' 1054" and 1054''' and thence be reflected outwardly to four of the eight lenses and similarly the four beams provided by composite lens 1050 may extend upwardly and thence impinge on the surfaces respectively of mirrors 1056, 1056', 1056" and 1056''' and thence be reflected outwardly to the other four lenses, interspaced beween the first four.

Another embodiment is shown in FIGURES 35 and 36 wherein a camera 1100 is provided wherein each frame provided on the motion picture film trained through the camera comprises an image extending through 300° with respect to the axis of rotation of the camera, as indicated by the arrow so marked which extends around the axis in FIGURE 36.

Camera 1100 may comprise a stationary housing having bottom 1101, side portion 1102 and inwardly extending top portion 1103. A plate or other supporting member 1104 may be supported from walls 1102. Upwardly extending shaft 1105 may be mounted to rotate in bearings 1106 and 1107 which may be attached respectively to support 1104 and bottom 1101. Supported from shaft 1105 and rigidly attached thereto to rotate therewith, there may be provided supporting member 1108. In an upwardly extending portion 1108' of member 1108 there may be mounted lenses 1109 having an optical axes extending substantially horizontally with respect to the axis of shaft 1105 and also radially with respect to the axis of shaft 1105 and also spaced respectively at 90° with respect to each other there being four lenses provided although for simplicity only a lesser number may be seen.

Disposed inwardly from each of lenses 1109 and supported by member 1108 there may be provided a prism 1110 disposed to reflect in a substantially vertical direction an axial beam impinging thereon from lens 1109. Disposed above each of prisms 1110 and supported from shaft 1105 or on an extension thereof such at 1105' by means such as plates 1111 and 1112 there may be provided a second prism 1113 which may be somewhat larger than prism 1110. Each of prisms 1113 may be disposed to reflect substantially outwardly horizontally a beam directed substantially vertically upwardly thereto from each of prisms 1110. Housing members such as member 1114 may be provided to prevent entry of light into the device between points other than at prisms 1113. Housings 1115 may be provided extending from the outer surface of member 1108' opposite each lens. The outer surface of each housing 1115 may be provided with an aperture or film gate 1116 and each may have mounted therein a pair of wedges 1117 and 1118 which may be adapted to be moved with respect to each other by means which for simplicity are not shown to provide the optical effect of a plate of glass of variable thickness with its opposite faces parallel and perpendicular to the optical axis of the lens. To accomplish focusing, one or both of each pair of wedges may be moved and each of the lenses may be moved if necessary in a manner described hereinafter in greater detail. Rotatably mounted on bearing 1120, attached to shaft 1105, there may be provided first film receiving portion 1121 which may extend outwardly and upwardly to a peripheral edge provided with a film receiving groove 1122. Rotatably mounted on bearing 1123 there may be provided an upper film receiving portion 1124 which may extend outwardly and thence downwardly to a peripheral edge portion which may provide a film receiving groove 1125. Bearing 1123 may be mounted on an inwardly extending portion 1108" of portion 1108'. Shaft 1105, all of the optical systems, support 1108 and members 1121 and 1124 may be adapted to rotate in the direction shown by arrow 1129 in FIGURE 36 but members 1121 and 1124 are adapted to rotate at the same speed as each other and at a speed substantially greater than the speed at which shaft 1105 and the optical systems supported thereby are rotated. Film web 1130 may be trained with its upper edge in groove 1125 and its lower edge in groove 1122. It may be observed that the entire center portion of the film which may be presented to apertures 1116 in rotation at different speeds of the two portions of the device is entirely unimpeded by support members, brackets or the like. Unexposed film may be carried on reel 1131 and exposed film may be wound up on reel 1132. The reels may be contained in reel housing 1133. Film 1130 drawn from reel 1131 may pass into the device in the direction indicated by arrow 1135 thence over idler 1136 into conjunction with grooves 1125 and 1122 thence passing around the optical systems which rotate at a slower speed while the film web moves circularly in conjunction with and at the same speed as members 1121 and 1124. The film 1130 may then pass over driven pulling sprocket 1137, thence over idler 1138 and thence onto reel 1132 in the direction indicated by arrow 1139.

Shield 1160 supported by fin-like support member 1161 extending from portion 1103 provides for occulting of the optical systems to provide the 300° angle of view before mentioned. Its outer edges are subtended by the angle indicated by dotted lines 1162.

Sprocket 1137 may be attached to shaft 1140 which may be received in bearings 1141 and 1142 attached respectively to bottom 1101 and support 1104. Idler 1138 may be attached to shaft 1143 which may be supported in bearings 1144 and 1145 attached respectively to bottom 1101 and support 1104. Shaft 1140 may be rotatably driven by motor 1146 which may be provided with sheave 1147 having belt 1148 trained thereover and trained over sheave 1149 attached to shaft 1140 to rotatably drive shaft 1140. Sheave 1150 may be securely attached to shaft 1140; belt 1151 trained over sheave 1150 may be trained over sheave 1155 attached to shaft 1105 to drive shaft 1105. Members 1121 and 1124 are driven by friction of the film therewith.

In the device of FIGURES 35 and 36, by suitable disposition of prisms 1110, 1113 and lenses 1109, the nodal point condition may be maintained, wherein by reason of the interposed reflective surfaces, each of the lenses, though disposed remote from the axis of rotation, and each of the systems is caused to behave optically as if each of the lenses were mounted with its second nodal point on the axis of rotation.

Suitable relation between the rotational speed of shaft 1105 on one hand and members 1121 and 1124 on the other hand and the film web 1130 carried thereby is provided by suitable proportioning of the sizes of sprocket 1137 and the sizes of sheaves 1150 and 1155. Means to provide a drive for reel 1132 to take up film and a drag for reel 1131 to let off film are conventional and are not shown for simplicity.

Referring now to FIGURES 37 and 38, a preferred modification of the embodiment of FIGURES 35 and 36, which may be utilized as a projector, is shown. Each of the four optical systems and the relationship of each to the other is as shown in FIGURES 35 and 36, the parts being correspondingly numbered. The film carrier members associated therewith are similar and correspondingly numbered as is the film web itself. The disposition of parts in the optical systems is slightly different from that of FIGURES 35 and 36 but represents a design rearrangement rather than difference in concept. Because projector 1100 of FIGURES 37 and 38 is utilized as a projector rather than a camera, it may not be necessary for example that the elements in each optical system be arranged to meet the nodal point condition required of a camera in accordance with the invention. Also it may be seen that mirrors may be substituted for the prisms in both camera 1100 and projector 1200. As in camera 1100 hereinbefore described, optical elements of projector 1100 are supported from shaft 1105″ which rotates in a substantially vertical orientation. Bearings 1123′ and 1120′ are also supported therefrom and in turn support members 1124′ and 1121′ which are adapted to have film web 1130 trained therearound.

It may be noted in conjunction with both camera 1100 and projector 1200 that, in contradistinction to projector 1000, it is not necessary to provide short vertical runs in the film to change the film from one plane to another as is required in conjunction with such members as 1033 and sprockets 1032 and 1036.

Since the film web travels at a relatively high rate of speed the avoidance of this complexity may be regarded as important.

In projector 1200, film web 1130 enters the device from a reel (not shown for simplicity) as shown at arrow 1231, passes over idler 1232, thence over idler 1233 and thence into conjunction with members 1124′ and 1121′, being received at its lower and upper edges respectively in grooves 1125 and 1122. After it has passed around the device it is trained over driving sprocket 1234 which serves to drive the film web and control its rate of speed and thence passes over idler 1235 and to a take-up roll (not shown for simplicity) in the direction shown by arrow 1236. Shaft 1105″ is driven in the direction shown by arrow 1237 from shaft 1238 which carries sheave 1239; belt 1240 is trained around sheave 1239 and also around sheave 1241 carried by shaft 1105″. Shaft 1238 which may also have sprocket 1234 attached thereto is driven by a motor (not shown) by means which for simplicity are not shown. The relative rotational speed of shaft 1105″ and the optical elements supported from it and the relatively higher speed of film web 1130 and members 1124′ and 1121′ which carry it in the same direction, as indicated by arrow 1242, may be determined by selecting suitable sizes for sprocket 1234, sheave 1239 and sheave 1241.

A particularly unique feature of projector 1200 is that, unlike substantially each projector hereinbefore described, all of the light in the beam emanating from a single arc lamp or filament lamp may be supplied to each optical system instead of incurring a necessity for dividing the beam from a lamp into two or more parts and supplying each of the parts to a separate optical system. Therefore, projector 1200 provides for appreciably more satisfactory illumination of a screen. For this purpose, a conical mirror 1250 having a cut-out portion to provide ends 1250″ is stationarily supported by means not shown. Bulls-eye condensing lenses 1251 are supported from supporting members 1252 which are supported from shaft 1105″. A portion of mirror 1250 is cut away at 1250′ as indicated by dotted lines to make one of lenses 1251 and its supporting member 1252 more visible in the view of FIGURE 38.

Also in FIGURE 38, belt 1240 and sheave 1241 are cut away and shown only by dashed lines and a portion of member 1124′ is cut away to facilitate a view of the parts therebeneath.

Each of lenses 1251 is adapted to concentrate a beam impinging vertically upwards thereagainst into a converging bundle of rays which may impinge substantially vertically upward against mirror 1250. Mirror 1250 may be disposed to reflect this converging beam through film 1130 and thence through film gates 1116 into the four respective optical systems. Three stationary mirrors 1253, 1254 and 1255 are provided disposed at substantially 45° to the vertical and provided with an aperture in the center of each through which shaft 1105″ may extend. Mirror 1254 is adapted to reflect light from each of its sides. Mirror 1256 is also adapted to reflect light from each of its sides and is provided with an aperture in its middle and is disposed at 45° to the axis of shaft 1105″; shaft 1105″ passes through the aperture and is provided with a collar 1157 which attaches mirror 1156 to shaft 1105″. Attached to mirror 1256 there may be provided a bracket 1258 to which mirror 1259 may be attached. Also supported from mirror 1256 there may be provided a bracket 1260 having aperture 1261 through which light may pass upward from mirror 1254 to mirror 1256 concentrically with shaft 1105″. Attached to bracket 1260 there may be provided mirror 1261. Mirror 1262 also may be adapted to reflect light from each of its sides and may be provided attached to shaft 1105″ by collar 1263 in the same manner as mirror 1256. Mirror 1264 which is supported from mirror 1262 by bracket 1265′ in the same manner that mirror 1261 is supported from mirror 1266 by bracket 1260 is cutaway to facilitate observation of mirror 1262 and collar 1263. On the side of mirror 1262 remote from the observer there is provided mirror 1265 which may be supported from mirror 1262 by a bracket in the same manner that mirror 1259 is supported from mirror 1256 by bracket 1258.

Means for supporting stationary mirror 1253, 1254 and 1255, for simplicity, is not shown.

Four arc lamps indicated as 1270, 1271, 1272 and 1273 may be provided. Each of the arc lamps may comprise a first carbon 1275, a second carbon 1276, and a reflector 1277. Filament lamps and condensing systems may suitably be substituted for the arc lamps. Each arc lamp is disposed to project a beam substantially horizontally against a stationary mirror oriented at 45° to the axis of rotation and substantially centered on the axis of rotation so that the beam is projected from the mirror substantially axially along shaft 1105″, the axis of which of course is the axis of rotation. Thus lamp 1273 is thus oriented with respect to mirror 1255. Lamp 1272 is thus oriented with respect to the upper surface of mirror 1254 and lamp 1271 is thus oriented with respect to the lower surface of mirror 1254 and lamp 1270 is thus oriented with respect to mirror 1253. Each of the beams thus projected is caused to impinge vertically downward or upward upon a rotating mirror supported from shaft 1105″, also oriented at substantially 45° with respect to the axis of rotation to cause each beam respectively to be projected substantially horizontally outward. Interposed in the path of each beam thus projected horizontally outward there is provided a mirror supported to rotate with shaft 1105″ which is oriented to reflect substantially upward the beam which impinges against it. Thus the beam from lamp 1273 which strikes mirror 1255 is reflected outward by mirror 1256 and thence upward by mirror 1259 and the beam which is projected inward from lamp 1272 is reflected upward by mirror 1254 thence outward by mirror 1256 and thence upward by mirror 1261 to the bulls-eye which is rotatably supported above mirror 1261. The paths of the beams thus just described are indicated in light dashed lines, the directions thereof being indicated with arrows. A beam likewise projected from lamp 1271 strikes the lower surface of mirror 1254, is reflected downwardly to mirror 1262, thence outwardly to mirror 1264 and thence upwardly to one of lenses 1251 which is shown as the lower lens in FIGURE 38 and is omitted in the cross-sectional view of FIGURE 37. Likewise the beam projected substantially horizontally from lamp 1270 impinges on mirror 1253 which reflects it upwardly against a surface of mirror 1262, thence outwardly to mirror 1265 and thence upwardly to that one of lenses 1251 which is above it as shown in FIGURE 38.

It is believed obvious to one skilled in the art that the device of FIGURES 28 and 29 may be provided instead of with eight optical systems as shown (referring to the optical systems each of which provides a separate image on the film rather than to the projection lamp systems) with two, four, six, ten or twelve such systems and likewise the device of FIGURES 35 and 36 and also that of FIGURES 37 and 38 may be provided instead of with four such systems, with two, six, eight, ten or twelve such systems.

Figure 40:
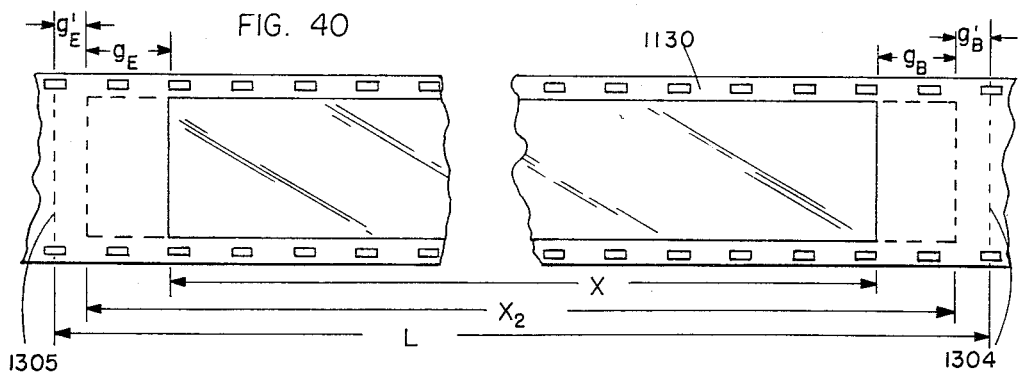
FIGURE 40 is a schematic elevation of a portion of a strip of film utilized in the device showing one frame and the position of an image within the frame.

To design a camera and projector in accordance with the invention described hereinbefore, one may use the following notation:

$f$=first focal distance—inches
$f'$=second focal distance—inches
$l$=first object distance—inches
$l'$=second object distance (image distance for focus on object at 1)—inches
$l'_Q = f' + x' + Q$—inches
$x = l - f$—inches
$x' = l' - f'$—inches
$L$=mechanical frame length=$X+G=X+w+M$, taken as beginning when the center of lens becomes unocculted at beginning of $\phi$ and ending when the center again becomes occulted at the other end of $\phi$—inches
$X$=picture length, i.e., length of image on film, if $w$ is small enough to be negligible—inches
$X_2 = X$ when $w$ is maximum, see FIGURE 40—inches
$\phi$=viewing angle—degrees
$D$=diameter at focal planes—inches
$w$=gate width=$X_2 - X$—inches
$N$=number of lenses—dimensionless
$F_S$=frames/sec.—$VN$—frames/sec.
$V$=rotational velocity of main support (film and mirror carrying portion) $V = F_S/N$—revolutions/sec.
$v_1$=velocity of a pt. on D=velocity of gate—inches/sec.
$v_2$=velocity of film at gate, with respect to gate=$L/T$=velocity of image at gate with respect to gate=negative velocity of gate with respect to film=$-v_C$—inches/sec.
$v_F$=velocity of image in space=velocity of film in space=$v_F + v_2$—inches/sec.
$v_F' = v_F$ in ft./min.=5 $v_F$—feet/min.
$v_C$=velocity of gate in circuit camera—inches/sec.
$V$=rotational velocity of circuit camera=revolutions/sec.
$t$=exposure time—sec.
$t_1, t_2$=first and subsequent glass thicknesses—inches
$T$=time for 1 revolution=$1/V$—sec.
$Q$=the distance $Q_1Q'_2$ in standard notation—see for example, page 20, Jenkins and White—inches
$\alpha$=angle of slope in each pair of wedges—degrees
$c$=any distance taken parallel to one of the faces of the pair of wedges—inches
$h$=height, taken perpendicular to $c$, of the slope of the plane at which the wedges are adjacent, for the distance $c$—inches
$\Delta c$=an increment of $c$, obtained by sliding one wedge on the other—inches
$\Delta h$=an increment of $h$, corresponding to $\Delta c$—inches
$g_B$=gap or space near the beginning of the frame due to effect of $w$, see FIGURE 40—inches
$g_E$=gap or space near the end of the frame due to effect of $w$, see FIGURE 40—inches
$g_B + g_E = w$
$g'_B$=gap or space at beginning of frame provided to avoid overlap of one image by the next, see FIGURE 40—inches
$g'_E$=gap or space at end of frame provided to avoid overlap of one image by the next, see FIGURE 40—inches $M$=margin=$g'_B + g'_E$—inches
$G$=gap=$g_B + g_E + g'_B + g'_E = w + M$—inches
$p'$=second nodal point
$p$=where only a single reflecting surface is located on the positive side of the lens, the point at which an axial ray is incident thereon
$p_1$=where two reflecting surfaces are located on the positive side of the lens, the point at which an axial ray is incident on the reflecting surface which is optically nearest the lens
$p_2$=where two reflecting surfaces are located on the positive side of the lens, the point at which an axial ray is incident on the reflecting surface which is optically farthest from the lens
$d$=distance from $p$ to $P'$—inches
$d_1$=distance from $p_1$ to $P'$—inches
$d_2$=distance from $p_2$ to $p_1$—inches
$d_3$=distance along geometric projection of unreflected axial ray from $p$ to $C_L$—inches
$d_4$=distance along geometric projection of unreflected axial ray from $p_2$ to $C_L$—inches
$C_L$=axis of rotation of lens carrying portion
$K'$=distance from second vertex to $P'$—inches
$n = n_D$ for air
$n_1 = n_D$ for glass In the case of rotation of a lens about an axis, such as for example the lens in a circuit camera or lens 1011b in FIGURE 28, the length of the image is given by $$X = 2\pi l' \quad (1)$$

if the lens is rotated through 360°, i.e., if $\phi = 360°$, and if $w$ is small enough to be negligible, then in the instance of the lens being rotated through less than 360°, i.e., $\phi < 360°$, no mater where the lens is located with respect to the axis of rotation, $$X = 2\pi l' \frac{\phi}{360} \quad (2)$$

By substitution this may also be expressed as $$X = \frac{\pi D \phi}{N\phi - 360} \quad (3)$$

or $$X = \frac{\frac{\pi D}{N}}{1 - \frac{360}{N\phi}} \quad (4)$$

These expressions may also be used for L where $X = L$. However, where $X \neq L$, L is given by $$L = X + w + M \quad (5)$$

or $$L = X + G \quad (6)$$

and thus for rotation of a lens through 360°

$$L = 2\pi l' + G \quad (7)$$

and for a lesser value of $\phi$ $$L = (2\pi l' + G)\frac{\phi}{360} \quad (8)$$

If $X = L$, then from the derivation shown in the appendix $$D = \frac{2l'\phi N}{360} - 2l' \quad (9)$$

for which may be substituted alternate expressions:

$$D = 2l'N\left(\frac{\phi}{360} - \frac{1}{N}\right) = 2l'\left(\frac{\phi N}{360} - 1\right) \quad (10)$$

and, dividing by X as given in (2)

$$D = \frac{XN}{\pi} - 2l' \quad (11)$$

but where $X \neq L$, D is determined from L:

$$D = \frac{LN}{\pi} - 2l' \quad (12)$$

or by substitution of the value for L from (8):

$$D = 2\pi N l' \frac{\phi}{360} - \frac{GN\phi}{\pi 360} - 2l' \quad (13)$$

A value for $l'$ may of course be found from the classical equation (see Fundamentals of Optical Engineering, Jacobs, Donald H., McGraw-Hill, 1943):

$$\frac{1}{l'} = \frac{1}{l} + \frac{1}{f'} \quad (14)$$

Figure 39:
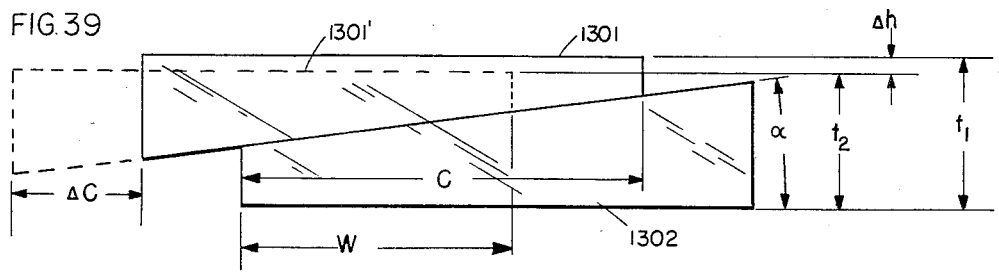
FIGURE 39 is a schematic side or end elevation of a pair of wedges showing notation used in mathematical analysis.

However, in order to prevent change of each of $v_F$ and X when $l'$ is changed in order to focus on objects located at various values of $l$, a pair of glass wedges, in contact, with opposite faces parallel, as described hereinbefore and shown schematically in FIGURE 39 may be inserted between each lens and its focal plane.

The classical expression for the shift in image position produced by thus introducing a glass plate (the equivalent of such a pair of wedges) is $$Q_1Q_2' = t\left(1 - \frac{n}{n'}\right) \quad (15)$$

(Fundamentals of Optics, Jenkins and White, 3rd Ed., 1957, p. 20) which in accordance with the notation used herein is expressed as $$Q = t_1\left(1 - \frac{n}{n'}\right) \quad (16)$$

Then it has been determined that $$l'_Q = f' + x' + Q \quad (17)$$

and $v_F$ and X may be held constant by varying Q to accommodate changes in $x'$ which are necessary to focus the lens.

If $v_F$ is held constant, L remains constant since $\phi$ is a constant for any given design. The need for holding $v_F$ constant is discussed both above and below. The variation in thickness needed to provide any required value of Q may of course be found from $$t_2 = \frac{Q}{\left(1 - \frac{n}{n'}\right)} \quad (17a)$$

In considering values for velocities one may first consider that, by definition:

$$v_F = v_1 + v_2 \quad (17b)$$

From simple mechanical considerations $$v_1 = V\pi D \quad (17c)$$

In a circuit camera, from the simple geometry of the device, $$v_c = V_c 2\pi l' \quad (17d)$$

Because each lens takes one and only one picture for each revolution it makes around the axis in both the camera (and projector) of this invention and also in a circuit camera, no matter what value $\phi$ has, but movement of film with respect to the gate in the two devices is in opposite directions $$V_c = -V \quad (17e)$$

and because $$v_2 = -v_c \quad (17f)$$

It is clear that $$v_2 = V 2\pi l' \quad (18)$$

and $$v_F = V\pi D + V 2\pi l' \quad (19)$$

$$= \pi V(D + 2l') \quad (20)$$

By substitution for D, the following expressions may be used if $X = L$ $$v_F = 2\pi l' V N \frac{\phi}{360} \quad (21)$$

or $$v_F = 2\pi l F_s \frac{\phi}{360} \quad (22)$$

and $$v_F = XF_s \quad (23)$$

or $$v_F = XVN \quad (24)$$

But for $L \neq X$, Equations 21 to 24 cannot be used and the value for D in Equation 20 must be determined from (12) or (13). Suitable expressions could be obtained by substitution of the value for D in (13) in Equation 20 but these would be cumbersome.

A simpler solution is found in $$v_F = LF_s \quad (25)$$

or $$v_F = LVN \quad (26)$$

where L may be obtained from (5) or (6).

Exposure time may be found simply from $$t = w/v_2 \quad (27)$$

or $$t = w/V 2\pi l' \quad (28)$$

In practice of course, $l'_Q$ is used in place of $l'$ for design calculations utilizing any of the above expressions.

It is generally found that it is not necessary in design practice to be much concerned with values for T and $T_1$.

In connection with design of the wedges, mechanical considerations predominate. A value for $t_1$ is chosen such that the wedges may be readily obtained commercially and will be as thin as possible, to minimize spherical aberration, but not be so thin as to be undesirably delicate. Spherical aberration of a glass plate is discussed at pp. 161–162, Jacobs, op cit. Application of notation is shown in FIGURE 39.

The permissible error in $t_1$ and $t_2$ is determined by the error in depth of field which may be tolerated. The standard operating error in $\Delta c$ is determined from a consideration of the mechanical system used to cause one wedge 1301 to slide with respect to the other 1302 from the position shown at 1301 to the position shown at 1301'. For example, a vernier may be used to drive each moveable wedge (e.g., against a spring biasing it in the opposite direction) in which case the error may be ±.002" or a micrometer may be used in which case the error may be ±.0005". Such means may be used, if desired, in place of the mechanism shown in FIGURES 28 and 29.

Then $\alpha$ may be determined from $$\frac{\text{tolerable error in } \Delta h}{\text{standard error in } \Delta c} = \tan \alpha \quad (29)$$

And the amount of sliding movement of wedge 1301, i.e., $\Delta c$, which is required to provide a desired change in thickness $t_2$, i.e., $\Delta h$, in order to provide a desired change in Q, may be determined from $$\Delta c = \Delta h \cot \alpha \quad (30)$$

Turning now to the problem of providing a specific design for a camera, several concerns are important.

The five variables L, $l'$, N, $\phi$ and D are interrelated and are the chief parameters, together with $w$, $F_s$ and V, to be considered in the design of a camera. If three of these five are given, most, if not all, other values follow mathematically.

It is desirable to minimize L in order to minimize film consumption. This requires primarily minimizing X; minimizing G is much less important. However X cannot be chosen directly since it is a function of $l'$ and $\phi$. Obviously, reducing either $l'$ or $\phi$ (or both) reduces X, see Equation 2. Expressions such as (3) and (4) should not be misinterpreted as indicating that changing either D or N will change X since each of the latter reduce to (2).

The values of $l'$ for a range of values of $l$ are automatically chosen when a lens having a given $f'$ is chosen. Choice of a lens also determines the maximum value of $w$, the height of the gate being determined by the standard in the industry for the width of film (e.g., 8 mm., 16 mm. or 35 mm.) for which the camera is being designed and maximum $w$ being accordingly determined as the width of a rectangle having said height, which will just fit within the circle determined by the aperture stop of the lens or within any smaller circle which must be used to avoid image deterioration at the corners of the rectangular image.

A lens may be chosen on the basis of having a short focal length $l'$ in order to minimize L. A better practice is to choose a lens on the basis of good photographic practice, to handle the greatest possible number of situations. In doing so, however, recognize that a lens of shorter or longer focal length may be used in its place, as long as the wedges may be replaced or adjusted at the same time to keep $v_F$ constant. Generally, the maximum number of situations which may be faced by the camera operator should be embraced within the scope of capabilities of lenses within these limits.

It may be pointed out that $v_F$ must be kept constant in order to avoid having film running in a projector wherein the drive mechanism of the projector would have to be adjusted periodically to match the $v_F$ of the projector to that of different series of frames taken by the camera at different values of $v_F$, which would be at best very difficult and cumbersome.

Choice of a value for $\phi$ is preferably based on considerations of providing the desired quazi-three dimensional effect on viewers. More specifically, the primary consideration in choosing $\phi$ is to make certain that the angle subtended by the screen with respect to each viewer in either a typical theater or a specific theater (or screen set-up) designed for showing film taken by the camera which is being designed is substantially greater than his own angle of view (normally considered to be 170°). Thus the angle to be subtended by the screen with respect to each viewer may be on the order of 230° or 230° so that if the viewer rotates his head somewhat he does not lose the desired effect. In order that the screen will extend in this manner, not only with respect to those in the front of the theater but also with respect to those in the back, it will probably generally be necessary that $\phi$ be from 290° to 330°.

Alternatively, choice of $\phi$ may be based on minimizing X by minimizing $\phi$. Although desirable to reduce film consumption, this seems hardly worthwhile if the basic purpose, accomplishment and effect of the device is compromised.

Figure 41:
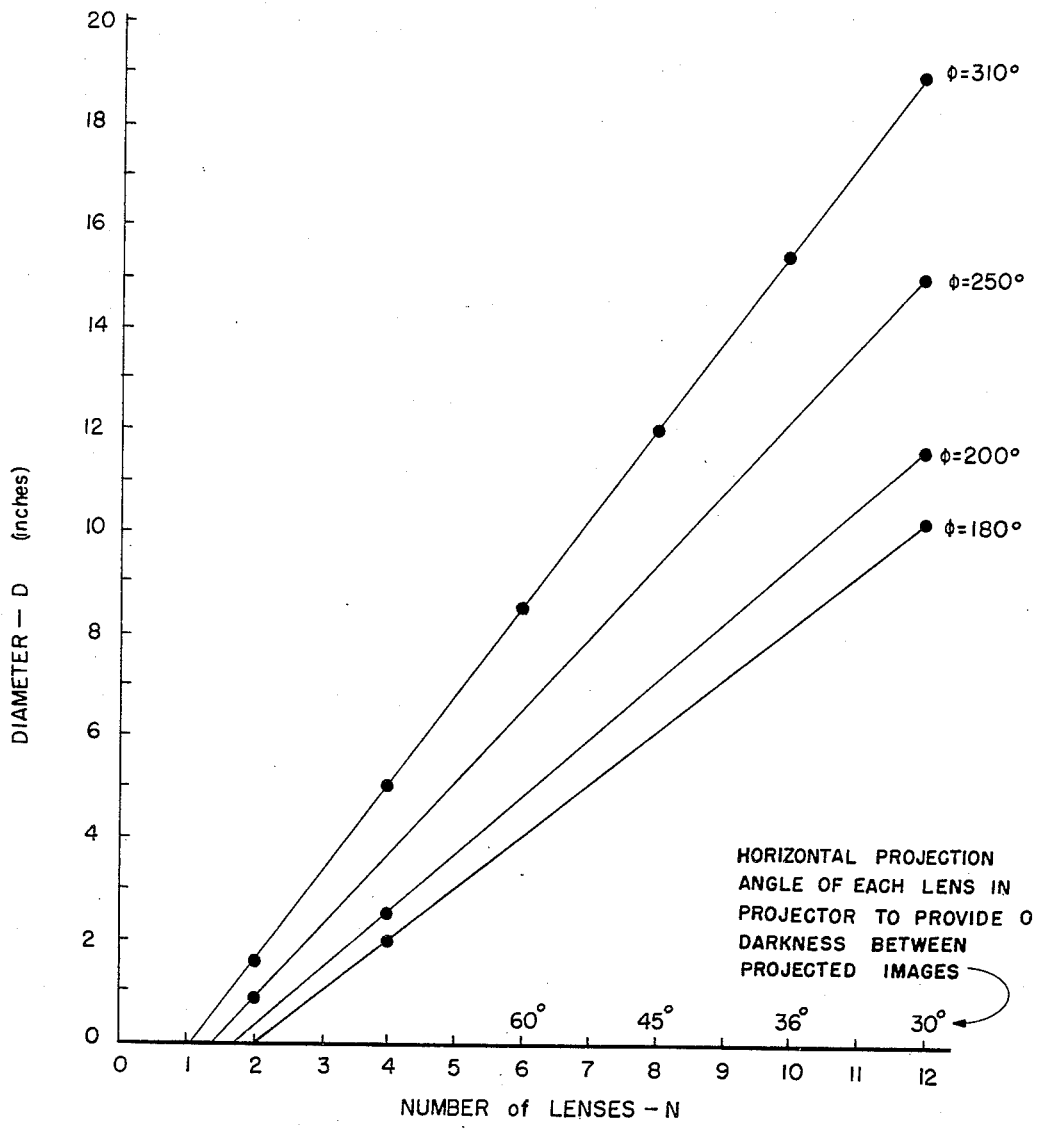
FIGURE 41 is a diagram showing relationships between number of lenses, diameter of the device at the focal planes and viewing angle.

If $\phi$ and $l'$ have been thus determined, one must then choose either D or N, whereupon the other follows. The relationship between N and D for various values of $\phi$ and for a given value of $l'$, namely 1.0142 inches, is shown in FIGURE 41, the relationship being determined from Equation 10 for the simplified case $X=L$. The set of curves shown in this figure is exemplary only since specific relationships will vary for the realistic case $X \neq L$ and for different values of $l'$.

Considerations in choosing D relate primarily to providing necessary space for the several elements and to centrifugal force. However, D is determined if L and N are known and $w$ is generally limiting in choice of both L and N. Providing a larger D may increase cost somewhat but generally provides more room for the parts and reduces centrifugal force in accordance with $$\text{force} = \frac{2 \text{ mass } v_F^2}{D} \quad (31)$$

for the film and the portions carrying it and $$\text{force} = \frac{2 \text{ mass } v_1^2}{D} = \frac{\text{mass } V^2 D}{2} \quad (32)$$

for the lenses, mirrors or prisms, and the portions carrying them.

When N is increased, V is decreased (desirable) and each of D and $t$ are increased. There is no change in $v_F$ nor in $v_1$ or $v_2$. Generally, increase of both D and $t$ are desirable.

The effect of increasing D is to reduce centrifugal force because while it increases directly with D it varies with the square of V which is reduced.

As an example, for $N=8$, assuming 1 oz. mass for an optical element, $$\text{force} = \frac{(2.25^2) 15.24}{2} = 42.4$$

For $N=10$ $$\text{force} = \frac{(1.8)^2 20.67}{2} = 33.5$$

Many lenses provide values for $w$ which require that N be determined by considerations of exposure time $t$. Generally it is desirable that it be possible in a movie camera to photograph, under some conditions, with an exposure time no less than $\frac{1}{30}$ of a second. Since by mechanically closing the gate somewhat to reduce $w$, $t$ may be decreased to any extent desired, e.g., to $\frac{1}{1000}$ or $\frac{1}{1500}$ sec., the need to provide $t$ as great as $\frac{1}{30}$ sec. in some instances is limiting.

In this instance, $t$ is determined by this simple modification of 28:

$$t = \frac{wN}{2\pi l' F_s} \quad (33)$$

and N is the only variable which remains to be varied, $F_s$ having been determined as hereinbelow described and $l'$ having been determined as above described.

On the other hand, if the maximum value of $t$ is accepted as limiting, which should be done if $w$ is small, an approximate value for N may be found from this modification of Equation 28

$$N = \frac{t 2\pi l'_Q F_s}{w} \quad (34)$$

Then a suitable whole number close to the value of N may be picked. Then actual values for V, D and $t$ may be found from equations previously presented, $F_s$ having been previously chosen in accordance with the considerations discussed below.

Referring now to FIGURE 40, it may be seen that Equations 5 and 6 follow, by definition, from the notation used. Dotted lines 1304 and 1305 appear in the figure to indicate the beginning and end of L, but do not actually appear on the film 1130 as indicia or otherwise. The image 1306, having length X, $X_2$ or an intermediate length, is not necessarily assumed to be located precisely symmetrically within each frame having length L, nor is it necessary that the effect of changing $w$ (to change $t$) produce a symmetrical change. In other words, it may be the case that $g_E \neq g_B$ and/or $g'_E \neq g'_B$.

Whether or not $g_E = g_B$ and/or $g'_E = g'_B$ the magnitude of $g_E$ and $g_B$ is entirely determined by the width of $w$ which is determined by lens characteristics and the value for $t$ which is required, as discussed above.

M may be chosen empirically and of course is made as small as possible to minimize L but its effect is almost negligible compared with that of X and is minimal as compared with that of $w$. It may be on the order of .100 inch or .025 inch.

To maintain the nodal point condition discussed earlier, one of these two relationships must be maintained, $$d = d_3 \quad (35)$$

or $$d_1 + d_2 = d_4 \quad (36)$$

depending on the design of the camera or projector under consideration.

It should be understood in considering the notation that unreflected axial rays are radial with respect to $C_L$.

It is of course a critical feature of the instant invention that that one of these two relationships which is appropriate be maintained.

In the event that $K'$ changes when $Q$ is changed, it is then necessary to move the lens elements (e.g., with the usual focusing device contained in the lens mounting barrel) to cause the second vertex to be moved so that $P'$ is adjusted to maintain one of these relationships.

The effect is to cause $P'$ to remain in the same place although the lens elements may be changed in location. Since the purpose of moving one of the reflecting surfaces is to compensate for a change in the location of $P'$, not for a mere change in location of the second vertex or other lens elements, it appears that the means for moving the mirrors which is provided in the device of FIGURES 28 and 29 is unnecessary but it may be retained, if desired, to facilitate adjustment for errors.

Determination of a value for $F_S$ must stem from a consideration of several factors. All of these involve the projection system and the effect of the projected images on the observers. A most important consideration is that the effect of persistence of vision makes it possible to provide motion pictures which give a suitable impression of motion with 16 or more image changes per second whereas the eye notices a flickering if an image or a lamp is alternately dark and light less than about 40 to 60 times per second. A second is that flicker sensitivity is greater if the image is brighter. This relationship is described by the Ferry-Porter law. Another is Talbot's law. Another is that Talbot's law holds only if the eye is exposed for at least 3% of the cycle. See Jacobs, cited above, and "Vision and Colour Vision," R. A. Houston, Longnious Greens and Co., 1932.

According to Monier (Technique of Making Films, P. Monier), "the illusion of reality is complete only if light and dark succeed one another at not less than 50 times per second. The eye can see 40 interruptions per second."

In standard projectors, when projecting at 16 frames per second, each frame is projected three times. A three bladed shutter is used. A projector designed to operate at 24 frames per second can have two blades. A two-bladed shutter gives noticeable flicker at 16 frames per second.

Monier states that in practice most sub-standard machines have three-bladed shutters.

One study has reported that the critical frequency limen for 34 boys, age 8 to 18, varied from 34 to 73 c.p.s. and for 23 girls in the same age group, varied from 31 to 58 c.p.s. For four of the boys it was over 56 c.p.s. For two of the girls it was over 48.5 c.p.s.

The dark phase was zero brightness as compared with the subdued room brightness used when projecting motion pictures; the light phase was much brighter than used in motion picture projection; therefore the light-dark ratio was effectively different from that represented by the shutter which provided equal light and dark periods so that the light phase was effectively longer than the dark phase. ("The Critical Frequency Limen for Visual Flicker in Children Between the Ages of 6 and 18," Miller, Vernon Lemont, Genetic Psychology Monographs, vol. 26, 1942).

It may be observed that standard fluorescent lamps operate at 60 c.p.s. and flicker is occasionally visible to some people.

In order to fully describe the pertinent aspects of a projection system it is believed desirable to state:

(1) Number of images per second;
(2) Brightness or intensity of each;
(3) Duration of each;
(4) Duration of dark time between each;
(5) Number of interruptions to be provided in each to raise frequency above critical level;
(6) Duration of each such interruption.

It is believed self-evident that the duration of the dark time between images and the duration of the interruptions should be equal and should be the minimum possible. Statements relating to Talbot's law suggest that each should be no less than about 3%. Duration of each light phase should be as long as possible to provide maximum efficiency in use of projection light.

Intensity may be determined conventionally.

Images per second, or $F_S$, may be chosen to provide maximum suitability of apparent movement to the observer. It appears that 16 may be an objectionably low figure whereas 24 may be an unnecessarily high figure.

Thus 18 may be a suitable value for $F_S$. The suitability of this value appears even greater when it is considered that providing two interruptions of each image provides a flicker rate of 54 c.p.s. which it appears is sufficient to prevent a sensation of flicker for nearly all people at the intensity levels normally used in projecting motion pictures, especially in view of the fact that modern 35 mm. sound projection systems have a flicker rate of 48 c.p.s.

A lower value such as 16 for $F_S$ would decrease L in a desirable manner and the flicker rate of 48 c.p.s. obtained with such a value may be suitable but it appears desirable to provide an image-change rate slightly greater in order to provide a better illusion of motion.

It may be mentioned that $F_S$ in the camera may be increased, for example to take "slow-motion pictures," simply by increasing V. If this is done, $t$ is of course decreased and film consumption is increased.

If the dark time and each interruption is made equal to 3% of the cycle, the total reduction in apparent intensity or brightness in accordance with Talbot's law is 9% which is much less than in a conventional projector.

Alternatively, by providing much less than 3% dark time, and no interruptions, the effect of zero-flicker may be provided. In other words, the eye may not recognize any flicker as being present.

The extent of dark-time may be controlled by controlling the horizontal projection angle of each lens in the projector as shown in FIGURE 41. Thus for a projector wherein $N=8$, the projection angle of each must be 45° to achieve zero darkness; if $N=10$ it must be 36°.

Figure 42:
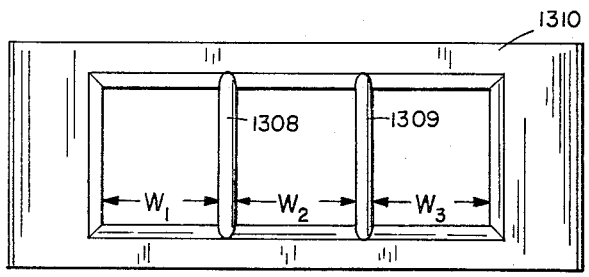
FIGURE 42 is a schematic elevation of one embodiment of a projector film gate in accordance with the invention.
Figure 43:
FIGURE 43 is a cross-sectional view taken on lines 43—43 in FIGURE 42.

Interruptions may be provided as shown in FIGURES 42 and 43 in a manner which is unique for the present invention. Vertical bars 1308 and 1309 may be provided in each film gate 1310, substantially at the focal plane, of the projector. In effect, $w$ for each lens is divided into a plurality of equal parts, $w_1$, $w_2$ and $w_3$, which may be greater in number than shown. The width of each bar determines the duration of each interruption.

EXAMPLE

Object: to determine the principal design parameters for a camera in accordance with FIGURES 35 and 36 with the exception that first-surface mirrors are substituted for the prisms which are shown.

To conform to a theater design which is not shown, a value of 320° is chosen for $\phi$.

In accordance with the above discussion, let $F_s = 18$.

To conform to good photographic practice for use with 16 mm. film, a moderately wide angle lens is chosen having a speed of $f/1.9$ and a field with a .3" radius, for which $f' = 1.0142"$. Since the height of the gate for 16 mm. film is .410", it is found that $w = .440"$.

$t_1$ is chosen to be .375" in accordance with the consideration discussed above and $\alpha$ is chosen to be 12°.

Then the following values are found from Equations 14, 16, 17 and 17a:

| | | | |
|---|---|---|---|
| $l$ | ∞ | 40″ | 24″ |
| $f'$ | 1.0142 | 1.0142 | 1.0142 |
| $x'$ | 0 | .0264 | .0448 |
| $l'$ | 1.0142 | 1.0406 | 1.0590 |
| $Q$ | .1250 | .0986 | .0802 |
| $l'_Q$ | 1.1392 | 1.1392 | 1.1392 |
| $t_2$ | .375 | .2858 | .2406 |
| $t_1-t_2$ | | .0892 | .1344 |
| $\Delta c$ | | .419 | .632 |
| $x$ | 6.35″ is found from equation (2). | | |
| $M$ | .100″ is chosen. | | |
| $L$ | 6.89″ is found from equation (5). | | |
| $v_F$ | 124.2 in./sec. is found from equation (25). | | |
| $v_F'$ | 620.0 ft./min. by definition. | | |

Since $w$ is small, $t$ is limiting. In accordance with the above discussion maximum $t$ is desired to be $\frac{1}{30}$ or .333 second.

$N = 9.75$ is then found as an approximate value from Equation 24.

$N = 10$ is then chosen as being the nearest integer.
$V = 1.8$, then, by definition.
$D = 20.67$ inches from Equation 12.
$t = .0341 \cong \frac{1}{29}$ second from Equation 27.

The locations of the mirrors are determined by choosing, on the basis of mechanical considerations, a value for $d_1$ or $d_2$.

If $d_2 = 2.0$ inches is chosen, then, from the geometry of the device $$d_1 = D - l'_Q - d_2$$
$$= 17.531 \text{ inches} \quad (37)$$

and from Equation 36

$$d_1 = 15.531 \text{ inches}$$

APPENDIX

Equation 2 shows one expression for X.
Another may be derived from graphic considerations:

$$X = \frac{\frac{360}{N}}{\phi} X + \frac{D}{\pi N} \quad (38)$$

$$= \frac{360 X}{\phi N} + \frac{D}{\pi N} \quad (39)$$

If expressions (2) and (39) are set equal, it is found that $$D = \frac{2l' \phi N}{360} - \frac{360 X}{\pi \phi} \quad (40)$$

and if expression (2) for X is substituted for X, the expression (9) for D is found. (End of appendix.)

The term "film" as used in the claims means either previously unexposed film or exposed and developed film or both except in those claims limited specifically either to a camera or projector in which case the term is intended to refer respectively to previously unexposed film and to previously exposed and developed film.

The several specific arrangements and embodiments which have been described and illustrated are illustrative of the mode of operation of the invention, but it will be understood that other mechanical arrangements and devices such as will be apparent to those skilled in the art, may be utilized in accordance with the invention. It will be observed that the invention is broad in scope and is to be limited only according to the claims.

Having thus disclosed my invention, I claim:

1. In a panoramic motion picture device, the combination of a supporting member rotatable continuously about a predetermined axis of rotation, a plurality of optical systems which are substantially identical optically, each system having its elements mounted upon and carried by said supporting member outwardly of said axis and each system comprising reflecting means and a lense and a film gate, each film gate being located substantially at the focal plane of its lens, each reflecting means being disposed on the object side of its lens and having a reflecting surface which is turned away from said axis, each lens and reflecting means of each optical system being spaced from said axis in such positions that the effective second nodal point of each lens falls on said axis, means to rotate said supporting member, a film web and means to move the same continuously and non-intermittently through said film gates at the same speed that images formed by said lenses move across said gates as a result of rotation of the supporting member.

2. In the device of claim 1, each optical system comprising a pair of transparent optical wedges disposed between the lens and its film gate, the wedges of each pair having closely disposed interjacent sides, the opposite sides of each pair of wedges being parallel to each other and perpendicular to the optical axis of the lens and means to slidably move at least one of the wedges of each pair with respect to the other to focus an image at the film gate and maintain constant the speed at which an image formed by the lens moves across the gate.

3. In the combination of claim 1, wherein each reflecting means comprises a pair of reflecting members, each having a reflecting surface, the reflecting surfaces of each pair of reflecting members being directly opposed to each other and being spaced apart along a line of direction which is parallel to said axis, and wherein the optical axes of the elements of each optical system are commonly disposed within a plane which is radially disposed with respect to said axis and which is parallel to and contains said axis.

4. The combination of claim 3, wherein the optical axis of the lens of each optical system is also disposed within a plane which is normal to said axis.

5. The combination of claim 1, wherein each reflecting means comprises two reflecting members, each having a reflecting surface.

6. In the device of claim 5, said reflecting members of each optical system being so disposed one to the other that the optical axis between them is parallel to said axis of rotation, the paths of a principal ray in each of said optical systems being contained in a plane, each of said planes containing said axis of rotation.

7. In the device of claim 6, said means for moving the web of film comprising first and second film reels, said reels being supported by stationary supports disposed outwardly of said supporting member, said film passing said gates in a single and at least semi-circular run having its center of curvature substantially coinciding with said axis of rotation.

8. In the device of claim 7, said film being trained so that each edge thereof of said run is disposed substantially entirely in a plane perpendicular to said axis of rotation.

9. In the device of claim 8, a plurality of light sources equal in number to the number of said optical systems, means to provide a converging beam of light rays from each of said sources, and means to introduce each of said beams into each of said systems substantially horizontally through said gates to said lenses.

10. In the device of claim 9, said means to introduce said beams into said systems comprising for each system a stationary tilted mirror having the axis of rotation passing substantially through the center thereof, a first tilted mirror supported to rotate with said supporting member and a second tilted mirror spaced substantially horizontally from said first tilted mirror and supported to rotate with said supporting member.

11. In a panoramic motion picture device, the combination of a stationary housing having a bottom portion, a top portion and a side portion, having a substantially vertical axis extending through said top and bottom portions and having in said side portion at least one opening extending through at least 170° with respect to said axis, means for supporting said housing, a supporting member within said housing mounted to rotate continuously about said axis, a plurality of optical systems which are substantially identical optically, each system having its elements mounted upon and carried by said supporting member outwardly of said axis and each system comprising reflecting means and a lens and a film gate, each film gate being located substantially at the focal plane of its lens, each reflecting means having a reflecting surface which is turned away from said axis, each lens and its reflecting means being spaced from said axis in such positions that the effective second nodal point of each lens falls on said axis, means to rotate said supporting member, means comprising first and second film reels to move a single web of film continuously and non-intermittently past said film gates at the same speed that images formed by said lenses move across said gates as a result of rotation of the supporting member.

12. In a panoramic motion picture device, the combination of a supporting member rotatable continuously about a substantially vertical axis of rotation, a plurality of optical systems which are substantially identical optically, each system having its elements mounted upon and carried by said supporting member outwardly of said axis and each system comprising reflecting means and a lens and a film gate, each film gate being located substantially at the focal plane plane of its lens, each reflecting means having a reflecting surface which is turned away from said axis, each lens and its reflecting means being spaced from said axis in such positions that the effective second nodal point of each lens falls on said axis, means to rotate said supporting member, a film web and means to move the same continuously and non-intermittently past said film gates at the same speed that images formed by said lenses move across said gates as a result of rotation of the supporting member.

13. In the device of claim 12, each reflecting means comprising two reflecting members, each having a reflecting surface.

14. In the device of claim 12, each reflecting means comprising a single reflecting member.

15. The device of claim 12 wherein the length of an image where $w$ is small enough to be negligible corresponds to a value determined by Equation 2.

16. The device of claim 12, wherein the velocity of the film corresponds to a value determined by Equation 20.

17. The device of claim 12 wherein the diameter at the focal planes corresponds to a value determined by Equation 12.

18. In the device of claim 12,
an upper circular peripheral receiving portion to receive the upper edge of a portion of said film web,
a lower circular peripheral receiving portion to receive the lower edge of said portion of said film web,
said receiving portions being supported by said supporting member,
said receiving portions being disposed to position said portion of said film web in a circular run adjacent to said gates and on the sides of said gates facing away from said axis, said device being devoid of members interpositionable between said gates and said portion of said film web which is disposed between said receiving portions,
said lenses being disposed between said gates and said axis.

19. In the device of claim 18,
each reflecting means comprising two reflecting members,
said reflecting members being disposed one above the other,
the paths of a principal ray in each optical system being contained in a plane,
each of said planes containing the axis of rotation,
first and second film reels,
said film being trained from one reel, thence through said circular run, and thence to the other reel,
said film being trained throughout its path with one edge above the other,
said reels being supported by rotating shafts,
said rotating shafts being supported by stationary supports.

20. In the device of claim 18, at least one of said circular peripheral receiving portions being supported rotatably from said supporting member to rotate with respect to said supporting member while said supporting member rotates.

21. In the device of claim 19, at least one of said circular peripheral receiving portions being supported rotatably from said supporting member to rotate with respect to said supporting member while said supporting member rotates.

22. In the device of claim 12, each of said optical systems being provided with means to focus the image of an object at the plane of said film gate, wherein said focus means comprises means to provide for all of the rays passing from the lens to the gate to form the image to pass through solid refracting material, and means to provide a maximum length of travel of said rays through said refracting material when the image of an object at infinite distance from said lens is focused at said plane and to provide diminished lengths of travel of said rays through said refracting material for focusing objects at distances relatively close to the lens.

23. In the device of claim 22, said solid refracting material comprising, in each optical system, a pair of optical wedges, mounted to move transversely with respect to each other, the faces at which said rays enter said pair and leave said pair being perpendicular to a principal ray.

24. In the device of claim 22, said solid refracting material comprising, in each optical system, a removeable flat plate which may be replaced with a plate of different thickness to provide for focusing on an object at a different distance.

25. In a panoramic motion picture device, the combination of a supporting member rotatable about a predetermined axis of rotation, a plurality of optical systems which are substantially identical optically, each system having its elements mounted upon and carried by said supporting member outwardly of said axis and each system comprising, as its elements, reflecting means and a lens and a film gate, each film gate being located substantially at the focal plane of its lens, each reflecting means being comprised of a reflecting surface which is disposed on the object side of its lens and which is turned away from said axis, each lens and reflecting means of each optical system being spaced from said axis in such positions that the effective second nodal point of each lens falls on said axis, the optical axes of the elements of each individual optical system being commonly disposed within a plane which is radially disposed with respect to said axis and which is parallel to and contains said axis, said film gates being substantially equally spaced radially from said axis, said film gates being disposed to receive principal rays which travel in a direction normal to said axis, and radially with respect to said axis, and said film gates being disposed radially outwardly on said supporting member from said lenses, the radial distance between each such film gate and said axis being greater than the focal length of the lens for such film gate, a film web, means training said web through said film gates in a path defining at least a substantial portion of a cylindrical surface, the axis of generation of said surface coinciding with said axis of rotation, means to continuously rotate said supporting member, and means to move said film web continuously and non-intermittently past said film gates at the same speed relative to said gates that images formed by said lenses move across said gates as a result of rotation of said supporting member.

26. The combination of claim 25, wherein each reflecting means comprises a pair of reflecting members, each having a reflecting surface, the reflecting surfaces of each pair of reflecting members being directly opposed to each other and being spaced apart along a lone of direction which is parallel to said axis.

27. The combination of claim 26, wherein the optical axis of the lens of each optical system is also disposed within a plane which is normal to said axis.

References Cited

UNITED STATES PATENTS

| | | | |
|---|---|---|---|
| 708,775 | 9/1902 | Lumiere | 95—17 |
| 866,257 | 9/1907 | Case. | |
| 2,349,931 | 5/1944 | Back | 95—17 |
| 2,928,313 | 3/1960 | Hattori. | |
| 3,191,182 | 6/1965 | Caldwell et al. | |

JULIA E. COINER, Primary Examiner

U.S. Cl. X.R.

95—17; 352—69, 84